(12) United States Patent
Nishi et al.

(10) Patent No.: US 11,176,360 B2
(45) Date of Patent: Nov. 16, 2021

(54) WORK SKILL SUPPORTING DEVICE AND WORK SKILL SUPPORTING SYSTEM

(71) Applicant: HITACHI, LTD., Tokyo (JP)

(72) Inventors: Kaichiro Nishi, Tokyo (JP); Akihisa Tsujibe, Tokyo (JP); Kei Imazawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 188 days.

(21) Appl. No.: 16/676,528

(22) Filed: Nov. 7, 2019

(65) Prior Publication Data
US 2020/0160047 A1 May 21, 2020

(30) Foreign Application Priority Data
Nov. 20, 2018 (JP) .............................. JP2018-217094

(51) Int. Cl.
*G06K 9/00* (2006.01)
*G06Q 10/06* (2012.01)
*G06F 3/14* (2006.01)
*G06K 9/62* (2006.01)

(52) U.S. Cl.
CPC .......... *G06K 9/00355* (2013.01); *G06F 3/14* (2013.01); *G06K 9/00624* (2013.01); *G06K 9/6215* (2013.01); *G06Q 10/063112* (2013.01)

(58) Field of Classification Search
CPC .... G07F 17/32; G07F 17/3211; G07F 17/323; G07F 17/3232; G07F 17/3244; G07F 17/3223; G07F 17/326; G07F 17/3225; G07F 17/3213; G07F 17/34; A63F 2250/307; A63F 13/52; A63F 13/00; A63F 13/58; A63F 13/573; G02B 30/26; G02B 27/017; G02B 2027/0187; G02B 27/0179; G02B 2027/0138
See application file for complete search history.

(56) References Cited

U.S. PATENT DOCUMENTS

| 6,542,621 B1 * | 4/2003 | Brill ................... G06K 9/00369 382/103 |
| 2014/0244344 A1 * | 8/2014 | Bilet .................. G06Q 10/0635 705/7.28 |
| 2018/0033276 A1 * | 2/2018 | Whelan .................. G08B 21/02 |

FOREIGN PATENT DOCUMENTS

JP 2011-134224 A 7/2011

* cited by examiner

*Primary Examiner* — Alex Kok S Liew
(74) *Attorney, Agent, or Firm* — Mattingly & Malur, PC

(57) ABSTRACT

A work skill supporting device include a storage unit that stores non-standard work model information including a condition of non-standard work, work procedure information including information indicating a work content and information indicating a part to be used in work, and a workplace internal image obtained by photographing an inside of a workplace; a time series skeleton information acquisition unit that acquires time series skeleton information of one or a plurality of workers from the workplace internal image; a non-standard work extraction unit that determines whether or not the time series skeleton information satisfies the condition; a part specification unit that specifies a part serving as a work target using the workplace internal image for the non-standard work determined as satisfying the condition; and a work content specification unit that specifies a work content of the non-standard work with reference to the work procedure information.

8 Claims, 20 Drawing Sheets

[FIG. 1]
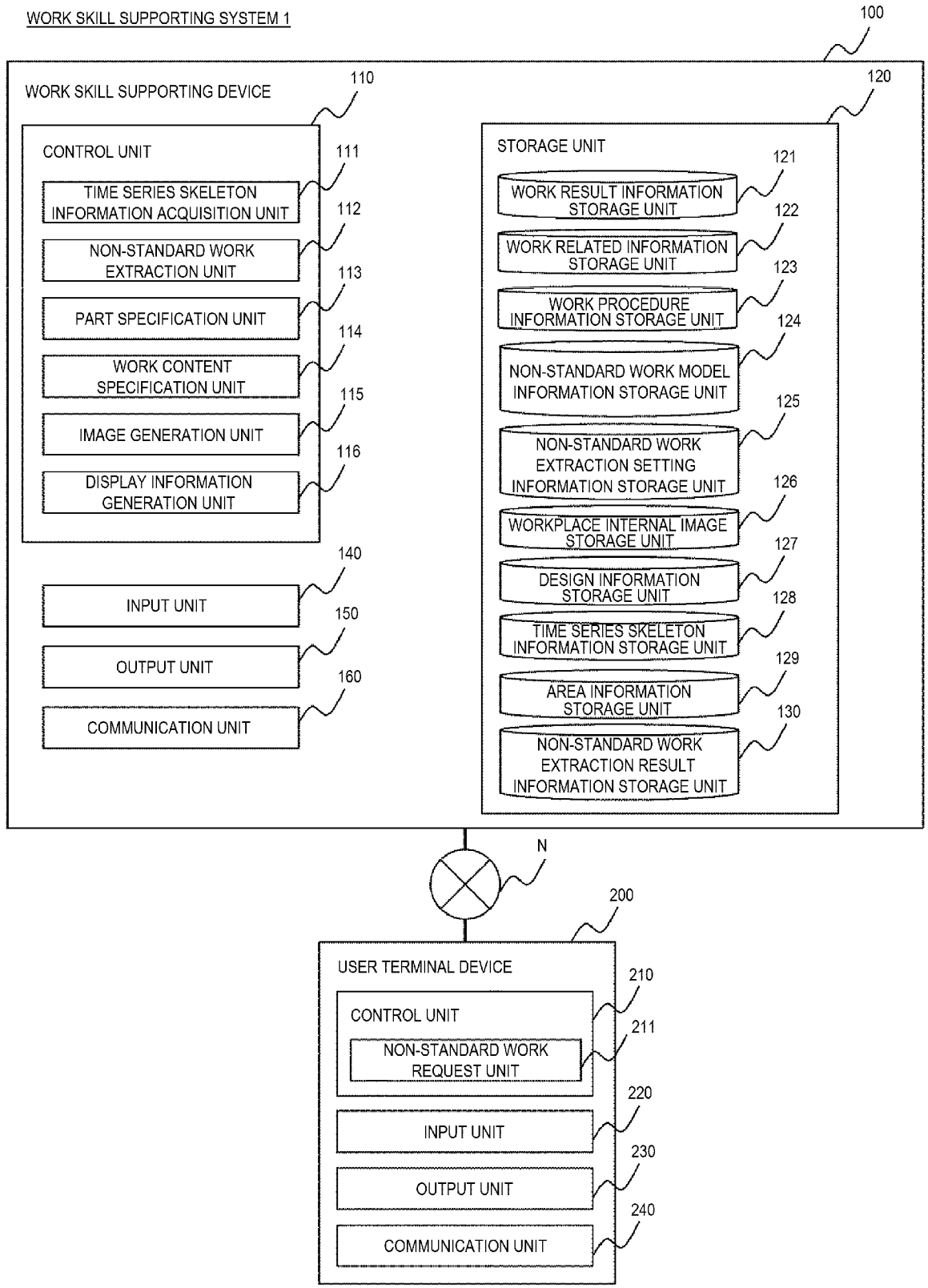

[FIG. 2]
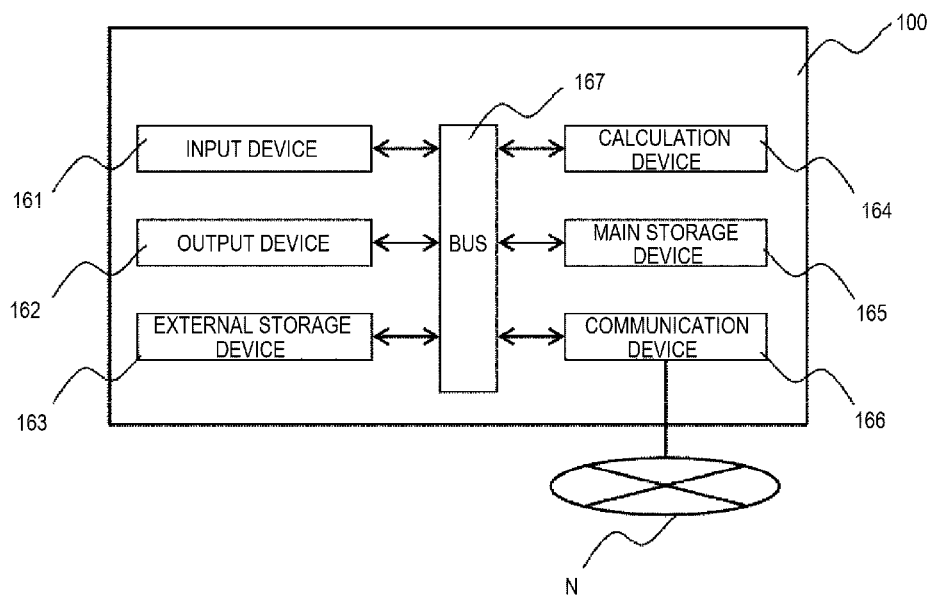

[FIG. 3]

WORK RESULT INFORMATION 300

| WORK RESULT IDENTIFIER | PROCESS NAME | WORK LOCATION NAME | WORKER | WORK START TIME | WORK COMPLETION TIME | MOVING IMAGE FILE | PRODUCT NAME | SKELETON |
|---|---|---|---|---|---|---|---|---|
| 0 | CONTROL PANEL ASSEMBLY | CONTROL PANEL ASSEMBLY A | ******* | 2018/07/20/9:00 | 2018/07/20/9:20 | 20180720900_0920.mp4 | ModelA | Null |
| 1 | CONTROL PANEL ASSEMBLY | CONTROL PANEL ASSEMBLY A | ******* | 2018/07/20/9:25 | 2018/07/20/9:45 | 20180720925_0945.mp4 | ModelB | Null |
| 2 | CONTROL PANEL ASSEMBLY | CONTROL PANEL ASSEMBLY A | ******* | 2018/07/20/10:00 | 2018/07/20/10:10 | 201807201000_1010.mp4 | ModelC | Null |

WORK RELATED INFORMATION 400

| PRODUCT NAME | PROCESS NAME | WORK PROCEDURE INFORMATION IDENTIFIER | DESIGN INFORMATION NAME |
|---|---|---|---|
| ModelA | CONTROL PANEL ASSEMBLY | ModelA/CONTROL PANEL ASSEMBLY PROCEDURE MANUAL.doc | ModelA/3DCAD.db |
| .... | .... | .... | .... |
| ModelX | CONTROL PANEL INSPECTION | ModelA/CONTROL PANEL INSPECTION PROCEDURE MANUAL.doc | ModelX/3DCAD.db |

401　402　403　404

NON-STANDARD WORK MODEL INFORMATION 500

FIG. 6

NON-STANDARD WORK EXTRACTION SETTING INFORMATION 600

| IDENTIFIER | NAME | SETTING VALUE | DESCRIPTION |
|---|---|---|---|
| 001 | SEARCH WIDTH OF FRAME | 10 | FEATURE QUANTITY EXTRACTION IS PERFORMED FROM CURRENT FRAME TO WHICH FRAME |
| 002 | FPS PROCESSING | 5 | HOW MANY FRAMES IS TO BE PROCESSD |
| 003 | PERIOD OF IMAGE TO BE SAVED | 10 | HOW MANY MINUTES TAKES TO SAVE |
| 004 | FPS SAVING | 5 | HOW MANY FRAMES ARE TO BE SAVED PER SECOND |
| 005 | EXTRACTION RANGE | 20 | RIGHT HAND IS EXTRACED IN WHICH RANGE |

601 602 603 604

[FIG. 7]
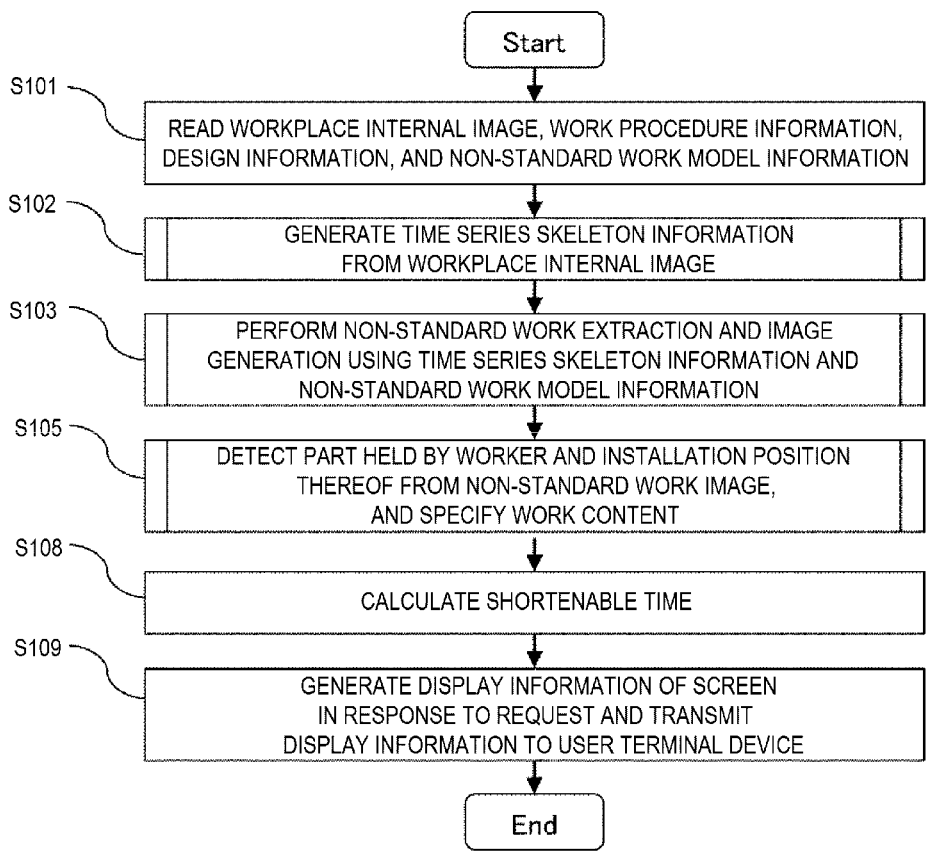

FIG. 9

TIME SERIES SKELETON INFORMATION 700

| IDENTIFIER | TIME | HEAD | NECK | RIGHT SHOULDER | ... | LEFT FOOT |
|---|---|---|---|---|---|---|
| 1 | 2018/07/20/9:00:17.00 | (140,50) | (140,60) | (120,60) | ... | (160,164) |
| 2 | 2018/07/20/9:00:18.00 | (143,40) | (130,60) | (140,60) | ... | (162,161) |
| 3 | 2018/07/20/9:00:19.00 | (142,45) | (150,60) | (130,60) | ... | (161,162) |
| ... | ... | ... | ... | ... | ... | ... |
| 10 | 2018/07/20/10:00:19.00 | (240,150) | (240,160) | (220,160) | ... | (260,260) |

FIG. 11

NON-STANDARD WORK EXTRACTION RESULT INFORMATION 800

| IDENTIFIER 801 | PROCESS NAME 802 | WORK NAME 803 | WORKER 804 | ANALYSIS SOURCE MOVING IMAGE 805 | NON-STANDARD WORK GENERATION TIME 806 | SHORTENABLE TIME 807 | IMAGE 808 | SKELETON INFORMATION 809 | WORK PROCEDURE INFORMATION APPLICABLE LOCATION 810 |
|---|---|---|---|---|---|---|---|---|---|
| 1 | CONTROL PANEL ASSEMBLY | RESISTANCE B ASSEMBLY | *** | 20180720 0900_0920.MP4 | 2018/07/20 /9:20:17.00 | 30SEC | 2018072009 2017_092 047.MP4 | 20180720092 017_092047.CSV | 4 |
| 2 | CONTROL PANEL ASSEMBLY | WIRING C ATTACHMENT | *** | 20180720 1000_1025.MP4 | 2018/07/20 /10:00:18.00 | 40SEC | 2018072010 0018_100 058.MP4 | 20180720100 018_100058.CSV | 20 |
| 3 | CONTROL PANEL ASSEMBLY | INVERTER A ATTACHMENT | *** | 20180720 1100_1115.MP4 | 2018/07/20 /11:00:19.00 | 30SEC | 2018072011 0019_110 049.MP4 | 20180720110 19_110049.CSV | 52 |
| ... | ... | ... | ... | | | ... | | ... | ... |
| 10 | CONTROL PANEL INSPECTION | RESISTANCE ATTACHMENT INSPECTION | *** | 20180720 2000_10 132.MP4 | 2018/07/20 /10:00:19.00 | 30SEC | 2018072011 0114_224 072.MP4 | 20180720110 019_110049.CSV | 31 |

[FIG. 13]
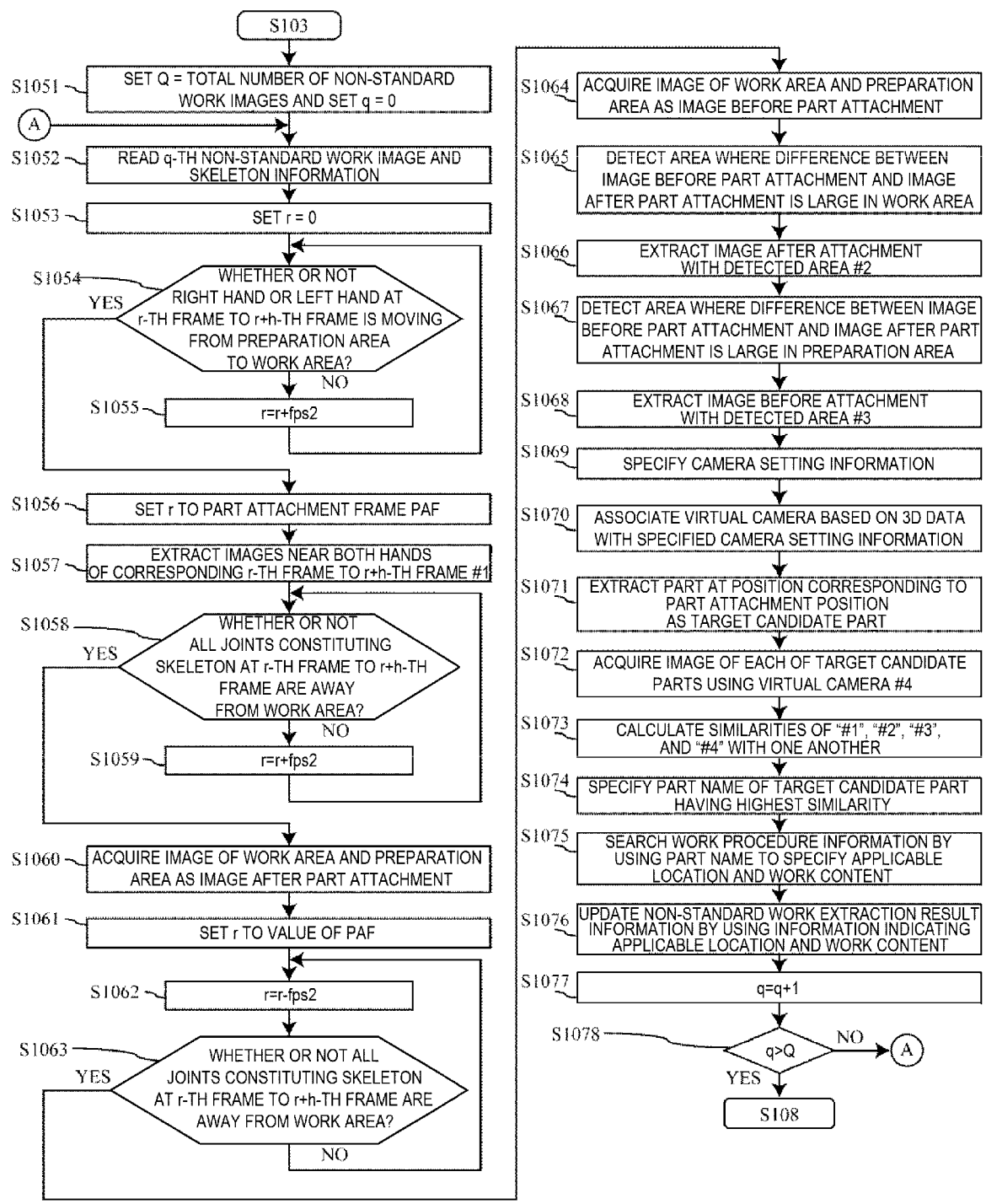

[FIG. 14A]
[FIG. 14B]
[FIG. 14C]
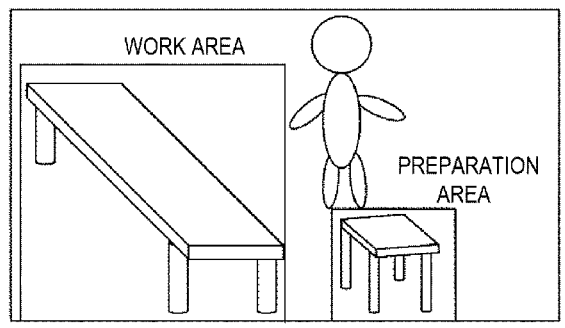

FIG. 15A  SIMILARITY INFORMATION 900
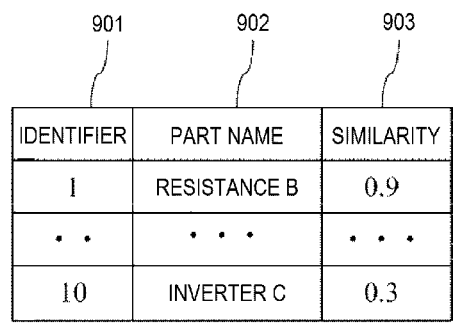
FIG. 15B  WORK PROCEDURE REFERENCE INFORMATION 1000
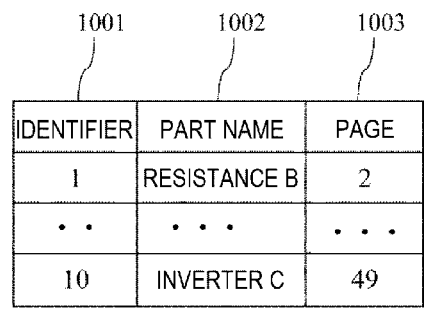

[FIG. 20]
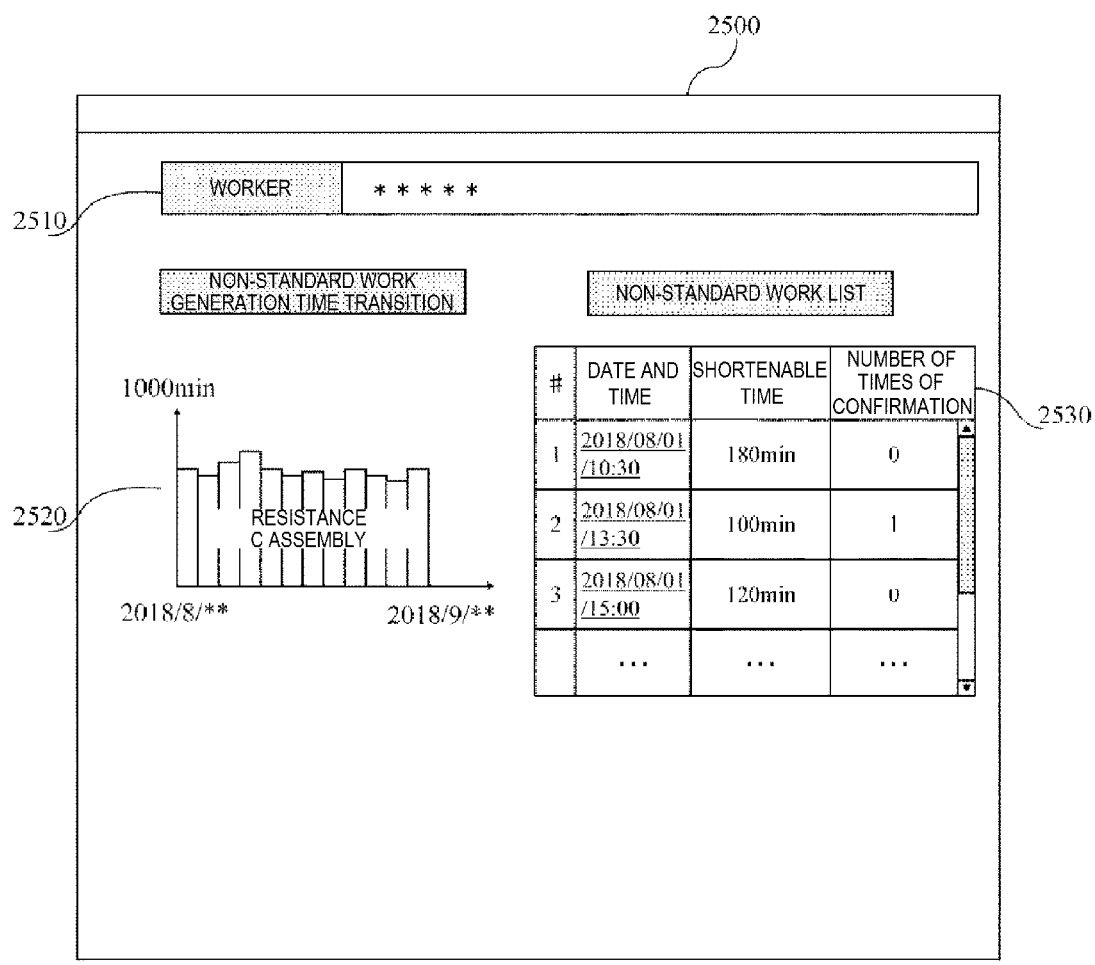

WORK SKILL SUPPORTING DEVICE AND WORK SKILL SUPPORTING SYSTEM

CROSS-REFERENCE TO RELATED APPLICATION

The present application claims priority from Japanese application JP 2018-217094, filed on Nov. 20, 2018, the contents of which is hereby incorporated by reference into this application.

TECHNICAL FIELD

The present invention relates to a work skill supporting device and a work skill supporting system.

BACKGROUND ART

There are a variety of technologies for supporting production work of a product.

Patent Literature 1 discloses, in paragraph [0050], that "in the present embodiment, a camera 150 images a work state of a worker 140 works, and first three work images and last three work images selected based on a length of work time are recorded in a server 101. The first three work images are stored as sample moving images for efficient working state, and the last three work images are stored as sample moving images for inefficient working state." In addition, in paragraph [0049], "when the work of worst three is performed, a manager and other related parties are notified." is disclosed.

RELATED ART LITERATURE

Patent Literature

Patent Literature 1: JP-A-2011-134224

SUMMARY OF INVENTION

Technical Problem

In order to support the production work, a system that prompts skill of the worker is desired. If work performed with a low skill level can be specified, appropriate support for improving the skill is possible.

According to the technology disclosed in Patent Literature 1, a moving image having a long work time is determined to be a moving image for inefficient work. However, in order to perform the above determination, it is necessary to make adjustment such that the moving image is generated for each work unit, which is complicated.

The invention has been made in view of the above circumstances, and an object thereof is to provide a technology for supporting the worker in the skill thereof more efficiently.

Solution to Problem

The present application includes a plurality of means for solving at least a part of the problems described above, and examples thereof are as follows.

In order to solve the above problems, the invention provides a work skill supporting device including a storage unit that stores non-standard work model information including a condition of non-standard work, work procedure information including information indicating a work content and information indicating a part to be used in work, and a workplace internal image obtained by photographing an inside of a workplace; a time series skeleton information acquisition unit that acquires time series skeleton information of one or a plurality of workers from the workplace internal image; a non-standard work extraction unit that determines whether or not the time series skeleton information satisfies the condition; a part specification unit that specifies a part serving as a work target using the workplace internal image for the non-standard work determined as satisfying the condition; and a work content specification unit that specifies a work content of the non-standard work with reference to the work procedure information using the part specified by the part specification unit.

Advantageous Effect

According to the invention, it is possible to provide a technology for supporting the worker in the skill thereof more efficiently.

Problems, configurations, and effects other than those described above are apparent from the following description of the embodiments.

BRIEF DESCRIPTION OF DRAWINGS

FIG. 1 is a functional block diagram showing an example of a work skill supporting system.

FIG. 2 is a diagram showing an example of a hardware configuration of a work skill supporting device.

FIG. 3 is a table showing an example of a data structure of work result information.

FIG. 4 is a table showing an example of a data structure of work procedure information.

FIG. 6 is a table showing an example of a data structure of non-standard work extraction setting information.

FIG. 7 is a flowchart showing an example of non-standard work output processing.

FIG. 9 is a table showing an example of a data structure of time series skeleton information.

FIG. 11 is a table showing an example of a data structure of non-standard work extraction result information.

FIG. 13 is a flowchart showing an example of part specification processing.

FIGS. 14C to 14C are diagrams for illustrating a work area and a preparation area. FIG. 14A is an image of the work area and the preparation area. FIG. 14B is an example of information for specifying the work area. FIG. 14C is an example of information for specifying the preparation area.

FIGS. 15A and 15B are tables showing an example of a data structure of information stored in a part of the work area of a storage unit. FIG. 15A is a table of a data structure of similarity information including calculated similarities. FIG. 15B is an example of a data structure of work procedure reference information.

FIG. 20 is a diagram showing an example of a worker information display screen.

DESCRIPTION OF EMBODIMENTS

Figure 5:
FIG. 5 is a table showing an example of a data structure of non-standard work model information.

Hereinafter, an exemplary embodiment of the invention will be described with reference to the drawings. FIG. 1 is a functional block diagram showing an example of a work skill supporting system. A work skill supporting system 1 includes a work skill supporting device 100 and a user terminal device 200. The work skill supporting device 100 is communicably connected to one or a plurality of the user terminal devices 200 via a network N.

The work skill supporting device 100 is a terminal device such as a Personal Computer (PC) or a server computer. The user terminal device 200 is a terminal device such as a PC or a smartphone. Although FIG. 1 shows a state in which one user terminal device 200 is connected to one work skill supporting device 100, the number of devices is not limited thereto.

In the present embodiment, the skill learning supporting device 100 supports a worker in the work skill thereof by extracting non-standard work. The non-standard work refers to work that does not meet a preset standard or work that exceeds the standard. In the present embodiment, when it is determined to be non-standard work, it is regarded that skill improvement of the worker is required.

The user terminal device 200 is operated by a worker as an example. At this time, the work skill supporting device 100 transmits information indicating the non-standard work in response to a request from the user terminal device 200. As another example, the user terminal device 200 is operated by a supervisor of the work. At this time, the work skill supporting device 100 transmits information indicating the non-standard work and information indicating a confirmation status of the worker in response to a request from the user terminal device 200.

The work skill supporting device 100 includes a control unit 110, a storage unit 120, an input unit 140, an output unit 150, and a communication unit 160. The control unit 110 comprehensively controls the work skill supporting device 100 as a whole. The storage unit 120 stores information input to the work skill supporting device 100 and information generated in the processing process of the work skill supporting device 100.

The input unit 140 receives an input operation from a user by using an input device 161 to be described later. The output unit 150 outputs information to an output device such as a display. The communication unit 160 transmits and receives information to and from the user terminal device 200.

The control unit 110 includes a time series skeleton information acquisition unit 111, a non-standard work extraction unit 112, a part specification unit 113, a work content specification unit 114, an image generation unit 115, and a display information generation unit 116. The time series skeleton information acquisition unit 111 acquires time series skeleton information of one or a plurality of workers from workplace internal images obtained by photographing an inside of a workplace. The time series skeleton information acquisition unit 111 detects a person appearing in the workplace internal image by using an algorithm that learned estimation of the skeleton, and acquires time series skeleton information. The algorithm is generated by a learning model such as Convolutional Neural Network (CNN), and is stored in advance in the work skill supporting device 100 in a format such as Hierarchical Data Format version 5 (HDF5). The algorithm will be described as a skeleton extraction model.

The non-standard work extraction unit 112 refers to the time series skeleton information, and determines whether or not the work of the worker is the non-standard work. The non-standard work extraction unit 112 calculates a feature quantity of the work using the time series skeleton information, and determines whether or not the work satisfies a predetermined non-standard work condition.

In addition, the non-standard work extraction unit 112 acquires a shortenable time by a predetermined method using the workplace internal image, and calculates an accumulative shortenable time obtained by accumulating the shortenable time acquired for a work content of the non-standard work. The shortenable time is a time that would not be required when there is no non-standard work, and corresponds to the shortenable time included in non-standard work extraction result information.

The part specification unit 113 specifies a part used in the non-standard work. The part specification unit 113 specifies a part included in the workplace internal image. More specifically, the part specification unit 113 calculates a similarity between an image of the part included in the workplace internal image and an image included in design information of the part, thereby specifying the part to be a work target of the non-standard work.

The work content specification unit 114 specifies a work content of the non-standard work by referring to work procedure information to be described later using the part specified by the part specification unit 113. The image generation unit 115 generates a non-standard work image obtained by photographing the non-standard work, using the workplace internal image.

The display information generation unit 116 generates display information of an image requested by the user terminal device 200. For example, the display information generation unit 116 generates display information of at least one of a non-standard work list screen for displaying a list of the work content of the non-standard work and a non-standard work confirmation screen including the number of times of confirmations of the non-standard work image and the work procedure information. For example, the display information generation unit 116 generates display information of a screen including the non-standard work image generated for the non-standard work and the work procedure information of the non-standard work.

The storage unit 120 includes a work result information storage unit 121, a work related information storage unit 122, a work procedure information storage unit 123, a non-standard work model information storage unit 124, a non-standard work extraction setting information storage unit 125, a workplace internal image storage unit 126, a design information storage unit 127, a time series skeleton information storage unit 128, an area information storage unit 129, and a non-standard work extraction result information storage unit 130.

The work result information storage unit 121 stores work result information indicating a work result. The work related information storage unit 122 stores work related information that is information related to the work. The work procedure information storage unit 123 stores work procedure information including information indicating the work content and information indicating a part used for the work. The work procedure information generally includes a work procedure manual used as a manual of a work procedure.

The non-standard work model information storage unit 124 stores non-standard work model information including conditions of the non-standard work. The non-standard work model information includes, for example, a condition for determining whether or not the work executed by the worker is non-standard work based on a position of the skeleton of the worker. The non-standard work extraction setting information storage unit 125 stores non-standard work extraction setting information including setting information used for extraction of the non-standard work.

The design information storage unit 127 stores design information of a plurality of parts. The design information includes a product name that is a name of a product, drawing information (that is, three-dimensional model information) of the product, a part name that is a name of each part that constitutes the product, drawing information of the part, and position information of the part relative to the product. The design information is information of design supporting software such as CAD.

The workplace internal image storage unit 126 stores one or a plurality of workplace internal images obtained by photographing the inside of the workplace. In the workplace internal image storage unit 126, camera setting information such as a camera installation position, a focal length, an angle of view, and a distortion rate when the workplace internal image is captured is stored for each workplace internal image. The time series skeleton information storage unit 128 stores time series skeleton information of the worker extracted using the workplace internal images. The time series skeleton information is generated by time series skeleton information generation processing to be described later.

The area information storage unit 129 stores work area information for specifying a work area that is an area in which work is performed, and preparation area information for specifying a preparation area which is an area in which preparation of the work is performed, in the workplace internal image. The non-standard work extraction result information storage unit 130 stores non-standard work extraction result information including information related to the non-standard work extracted by non-standard work extraction processing to be described later.

The user terminal device 200 includes a control unit 210, an input unit 220, an output unit 230, and a communication unit 240. The control unit 210 comprehensively controls the user terminal device 200 as a whole. The input unit 220 receives an input operation from the user via an input device. The output unit 230 outputs information to an output device such as a display. For example, the output unit 230 causes the output device to display the non-standard work list screen and the non-standard work confirmation screen using the display information transmitted from the work skill supporting device 100. The communication unit 240 transmits and receives information to and from the work skill supporting device 100.

The control unit 210 includes a non-standard work request unit 211. In response to an input operation by a worker or a supervisor, the non-standard work request unit 211 requests information indicating the non-standard work from the work skill supporting device 100.

FIG. 2 is a diagram showing an example of a hardware configuration of the work skill supporting device 100. The work skill supporting device 100 includes the input device 161, an output device 162, an external storage device 163, a calculation device 164, a main storage device 165, and a communication device 166, and each component is connected by a bus 167.

The input device 161 is a device that receives an input operation from a user, and is, for example, a touch panel, a keyboard, a mouse, a microphone. The output device 162 is a device that performs output processing of data stored in the work skill supporting device 100, and is, for example, a display device such as a Liquid Crystal Display (LCD), or a printer. The input unit 140 can use the input device 161, and the output unit 150 can use the output device 162.

The external storage device 163 is, for example, a writable and readable storage medium such as a Hard Disk Drive (HDD). The calculation device 164 is a central calculation device such as a CPU, and executes processing in accordance with a program recorded in the main storage device 165 or the external storage device 163. Each processing unit constituting the control unit 110 realizes each function by the calculation unit 164 executing a program.

The main storage device 165 is a storage device such as a Random Access Memory (RAM), and functions as a storage area where a program and data are temporarily read. The communication device 166 is a device for connecting the work skill supporting device 100 to the network N, and is, for example, a communication device such as a Network Interface Card (NIC).

The function of the storage unit 120 is realized by the main storage device 165 or the external storage device 163. The function of the storage unit 120 may be realized by a storage device on the network N.

The processing of each component of the work skill supporting device 100 may be executed by one piece of hardware, or may be executed by a plurality of pieces of hardware. Further, the processing of each component of the work skill supporting device 100 may be realized by one program, or may be realized by a plurality of programs.

The user terminal device 200 has a hardware configuration similar to that of the work skill supporting device 100. Therefore, the description of the hardware configuration of the user terminal device 200 is omitted.

FIG. 3 is a table showing an example of a data structure of work result information 300. The work result information 300 includes a work result identifier 301, a process name 302, a work location name 303, a worker 304, a work start time 305, a work completion time 306, a moving image file 307, a product name 308, and a skeleton 309.

The work result identifier 301 is identification information for specifying a record of the work result information 300. The process name 302 is information indicating a name of a work process. The work location name 303 is information indicating a place where the work is performed. The worker 304 is information indicating the worker who performs the work specified by the work result identifier 301. The work start time 305 and the work completion time 306 are information indicating a time when the worker starts the work and a time when the work is completed. As an example, the work start time 305 and the work completion time 306 may be a photographing start time and a photographing end time of the workplace internal image.

The moving image file 307 is information indicating a storage destination of the workplace internal image obtained by photographing the work specified by the work result identifier 301. That is, by referring to the moving image file 307, it is possible to specify the workplace internal image when the work is being executed. The product name 308 is information for specifying a product to be generated by the work.

The skeleton 309 is information indicating a storage destination of a recording file (for example, Comma Separated Values (CSV) file) of skeleton information generated based on the moving image file 307. Based on the recording file, the time series skeleton information is generated. Since the work result information 300 shown in FIG. 3 is information before the time series skeleton information generation processing to be described later is executed, the recording file is not generated. Therefore, "Null" indicating that data does not exist is stored in the skeleton 309.

FIG. 4 is a table showing an example of a data structure of work related information 400. The work related information 400 includes a product name 401, a process name 402, a work procedure information identifier 403, and a design information name 404. The product name 401 is information indicating a product serving as a work target.

The process name 402 is information indicating a work process, and corresponds to the process name 302 of the work result information 300 in FIG. 3. The product is generated through one or a plurality of processes. In the work related information 400 of the present embodiment, for example, the work procedure information identifier 403 is uniquely set for a combination of the product name 401 and the process name 402. In this respect, it can be said that the process name 402 is the name of the work procedure. One work process is constituted by one or a plurality of work contents.

The work procedure information identifier 403 is identification information for specifying the work procedure information. As shown in FIG. 4, the work procedure information identifier 403 may be information indicating a storage destination of the work procedure information. The design information name 404 is information for specifying design information of a product.

FIG. 5 is a table showing an example of a data structure of non-standard work model information 500. The non-standard work model information 500 includes an identifier 501, a name 502, an upper limit 503, a lower limit 504, and a description 505. The identifier 501 is identification information for specifying a record of the non-standard work model information 500. The name 502 is information indicating a name of the condition of the non-standard work.

The upper limit 503 is a value indicating an upper limit of a predetermined feature quantity when the work is non-standard work. The lower limit 504 is a value indicating a lower limit of a predetermined feature quantity when the work is non-standard work. The description 505 is information for illustrating the condition of the non-standard work. By referring to the description 505, the type of the feature quantity included in the upper limit 503 and the lower limit 504 can be specified.

In the non-standard work model information 500 shown in FIG. 5, the upper limit 503 and the lower limit 504 for the type of the feature quantity specified by the description 505 are regarded as conditions of the non-standard work. In other words, the condition of the non-standard work in the non-standard work model information 500 is not limited to the upper limit value and the lower limit value of the feature quantity. The non-standard work model information 500 may include information that can determine whether or not the work is non-standard work by using the feature quantity. Hereinafter, for the sake of convenience, an example will be used for description in which the condition of the non-standard work included in the non-standard work model information 500 can be specified by the upper limit value and the lower limit value in the similar manner as the non-standard work model information 500 shown in FIG. 5.

The description 505 of the most significant record in the non-standard work model information 500 shown in FIG. 5 includes "ACCUMULATION OF ABSOLUTE VALUE OF DIFFERENCE IN RIGHT-HAND COORDINATE xy BETWEEN FRAMES FOR EACH FRAME". That is, the record can be considered to indicate the condition of the non-standard work related to the feature quantity of the type obtained by "ACCUMULATING ABSOLUTE VALUE OF DIFFERENCE IN RIGHT-HAND COORDINATE xy BETWEEN FRAMES FOR EACH FRAME". A value (feature quantity) obtained by accumulating the absolute value of the difference in the right-hand coordinate xy for each frame is regarded as the non-standard information when being equal to or smaller than "10" which is the upper limit 503 and equal to or greater than "0" which is the lower limit 504.

In the description 505 of a second record from the top, "DIVISION OF SUM OF xy COORDINATES OF RIGHT-HAND BY THE NUMBER OF FRAMES" is described. That is, the record indicates the condition of the non-standard work related to the feature quantity of the type obtained by "DIVIDING SUM OF xy COORDINATES OF RIGHT-HAND BY THE NUMBER OF FRAMES". As described above, it is possible to specify the type of the feature quantity to be a determination standard of the non-standard work by referring to the description 505, and the type of the feature quantity may be stored in the storage unit 120 as a feature quantity extraction library separately from the non-standard work model information 500.

FIG. 6 is a table showing an example of a data structure of non-standard work extraction setting information 600. The non-standard work extraction setting information 600 includes an identifier 601, a name 602, a setting value 603, and a description 604. The identifier 601 is identification information for specifying a record of the non-standard work extraction setting information 600.

The name 602 is information indicating a type of the setting value 603 to be described later. The setting value 603 is a value set for the type specified by the name 602. The description 604 is information for illustrating a property of a set value.

FIG. 7 is a flowchart showing an example of non-standard work output processing. The processing is started when, for example, the work skill supporting device 100 receives a request for the non-standard work from the non-standard work request unit 211 of the user terminal device 200. It is regarded that that when the non-standard work request unit 211 requests the work skill supporting device 100 to display information on the non-standard work list screen to be described later and display information on the non-standard work confirmation screen, a non-standard work request is transmitted.

First, the non-standard work extraction unit 112 reads the workplace internal image, the work procedure information, the design information, and the non-standard work model information (step S101). Specifically, the non-standard work extraction unit 112 refers to the work result information 300 and specifies a record to be a target of the non-standard work output processing. As an example, the non-standard work extraction unit 112 specifies a target record of the work result information 300 by referring to information indicating a request for the non-standard work from the user terminal device 200. For example, when the non-standard work of a predetermined date is requested, the non-standard work extraction unit 112 extracts a record of the work result information 300 corresponding to the date and the work start time 305 and executes the following processing for each of the extracted records.

Further, the non-standard work extraction unit 112 refers to the moving image file 307 of the specified record, thereby specifying the workplace internal image and reading the workplace internal image into the work area of the storage unit 120. The non-standard work extraction unit 112 refers to the work related information 400 by using a combination of the process name 302 and the product name 308 of the specified record, and specifies a record including the process name 402 and the product name 401 corresponding to the combination. The non-standard work extraction unit 112 refers to the work procedure information storage unit 123 using the work procedure information identifier 403 included in the specified record of the work related information 400, and reads corresponding work procedure information into the work area of the storage unit 120.

Further, the non-standard work extraction unit 112 refers to the design information storage unit 127 using the design information name 404 included in the specified record of the work related information 400, and reads corresponding design information into the work area of the storage unit 120. The non-standard work extraction unit 112 reads the non-standard work model information 500 into the work area of the storage unit 120.

Next, the time series skeleton information acquisition unit 111 generates time series skeleton information from the workplace internal image (step S102).

Figure 8:
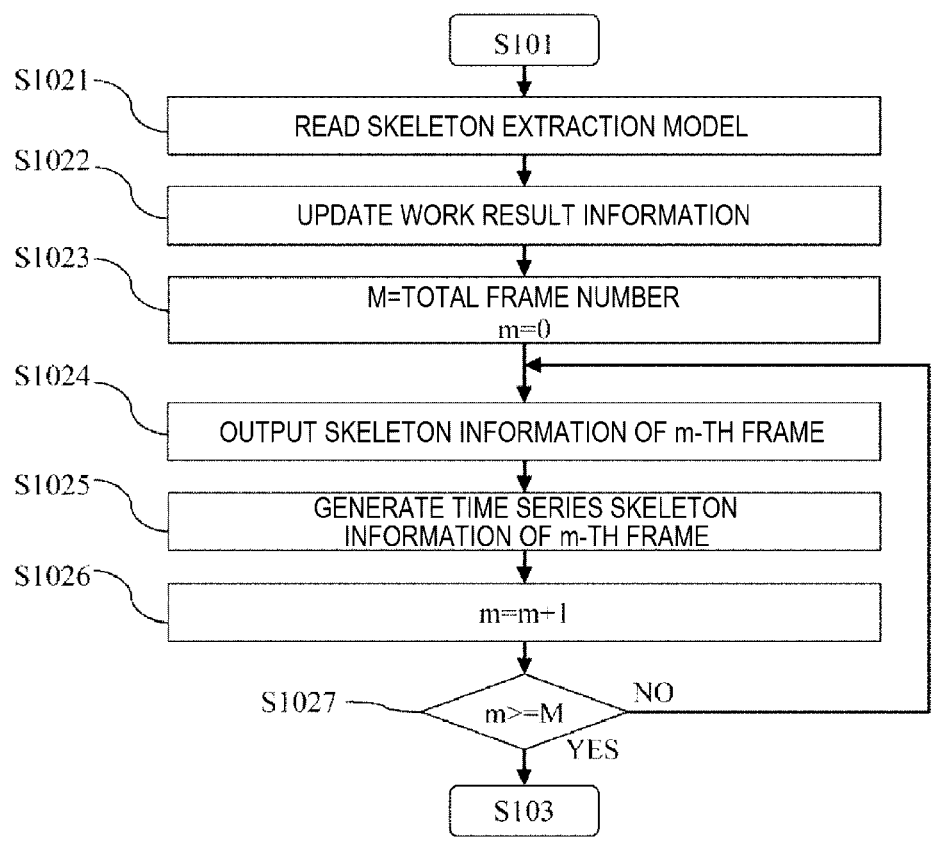
FIG. 8 is a flowchart showing an example of time series skeleton information generation processing.

FIG. 8 is a flowchart showing an example of time series skeleton information generation processing. The figure illustrates the processing performed in step S102 of FIG. 7 in more detail.

First, the time series skeleton information acquisition unit 111 reads a skeleton extraction model (step S1021). Specifically, the time series skeleton information acquisition unit 111 reads a skeleton extraction model generated in advance for estimating the skeleton from the workplace internal image into the work area of the storage unit 120. The time series skeleton information acquisition unit 111 executes the following processing on the workplace internal image read in step S101 in FIG. 7.

Next, the time series skeleton information acquisition unit 111 updates the work result information 300 (step S1022). Specifically, the time series skeleton information acquisition unit 111 inputs information indicating a storage destination of skeleton information to be described later to a location corresponding to the skeleton 309 in the record of the work result information 300 including the read workplace internal image, and updates the work result information 300.

Next, the time series skeleton information acquisition unit 111 sets M as a total frame number in the workplace internal image, and sets a variable m indicating a frame number to be processed to 0 (step S1023).

Next, the time series skeleton information acquisition unit 111 outputs a skeleton position of the m-th frame (step S1024). Specifically, the time series skeleton information acquisition unit 111 inputs the workplace internal image of the m-th frame to the skeleton extraction model read in step S1021, and obtains skeleton information of the m-th frame. The obtained skeleton information is stored in the storage unit 120 as a recording file (for example, CSV file). The storage destination is the storage destination into which the work result information 300 is input in step S1022.

Next, the time series skeleton information acquisition unit 111 generates time series skeleton information of the m-th frame (step S1025). Specifically, the time series skeleton information acquisition unit 111 generates time series skeleton information in which the photographing time of the m-th frame and the position of the skeleton of the worker are associated with each other using the skeleton information output in step S1024. The time series skeleton information will be described later in detail.

Next, the time series skeleton information acquisition unit 111 adds 1 to m (step S1026).

Next, the time series skeleton information acquisition unit 111 determines whether or not m≥M (step S1027). If it is determined that m≥M ("YES" in step S1027), the time series skeleton information acquisition unit 111 ends the processing of the flowchart. Then, the processing moves to step S103 in FIG. 7.

If the time series skeleton information acquisition unit 111 determines that m≥M (determined as "NO" in step S1027), the time series skeleton information acquisition unit 111 moves the processing to step S1024. That is, the processing of step S1024 and subsequent steps is executed for other frames that are consecutive to the frame in which the skeleton information and the time series skeleton information is generated.

FIG. 9 is a table showing an example of a data structure of time series skeleton information 700. The time series skeleton information 700 includes an identifier 701, a time 702, and a skeleton position 703. The identifier 701 is identification information for specifying a record of the time series skeleton information 700. The time 702 is information indicating a time.

As described above, although the time series skeleton information acquisition unit 111 generates the skeleton information from a predetermined frame of the workplace internal image and generates the time series skeleton information 700 from the skeleton information, and the time at which the predetermined frame is photographed is the time 702. For example, the time series skeleton information acquisition unit 111 calculates the time 702 by adding the value obtained by multiplying the time per frame and the frame number to the work start time of the work result information 300 including the moving image file 307 that specifies the workplace internal image.

The skeleton position 703 is information indicating the position of the skeleton of the worker at the time 702. For example, as shown in FIG. 9, the skeleton position 703 is information in which a position of a joint such as a head 703a, a neck 703b, and a right shoulder 703c is associated with information indicating the joint of the worker. For example, as shown in FIG. 9, the position of the joint is represented by a two-dimensional coordinate with respect to the workplace internal image. The skeleton position 703 may be represented by, for example, a three-dimensional coordinate of the joint position in a real space such as the workplace. Any information may be used as long as the position of the skeleton can be specified.

In other words, the time series skeleton information 700 shown in FIG. 9 includes a skeleton position of one worker. However, for example, when a plurality of persons are included in the workplace internal image, the skeleton information and the time series skeleton information 700 may be generated for each worker.

In the above-described time series skeleton information generation processing, the time series skeleton information 700 is generated for each frame based on the skeleton information generated for each frame of the workplace internal image. However, an interval for generating the skeleton information from the workplace internal image and an interval for generating the time series skeleton information 700 from the skeleton information are not limited thereto. For example, the skeleton information may be generated across a predetermined number of frames among consecutive frames of the workplace internal image. Further, for example, the time series skeleton information 700 may be generated across a predetermined number of records among a plurality of consecutive skeleton information records.

A generation timing of the time series skeleton information 700 is not limited to the example shown in FIG. 8. For example, the time series skeleton information 700 may be generated after the skeleton information is generated for all the frames (or frames across a predetermined number of frames) of the workplace internal image.

The description is returned to FIG. 7. Next, the non-standard work extraction unit 112 and the image generation unit 115 perform non-standard work extraction and image generation by using the time series skeleton information 700 and the non-standard work model information 500 (step S103).

Figure 10:
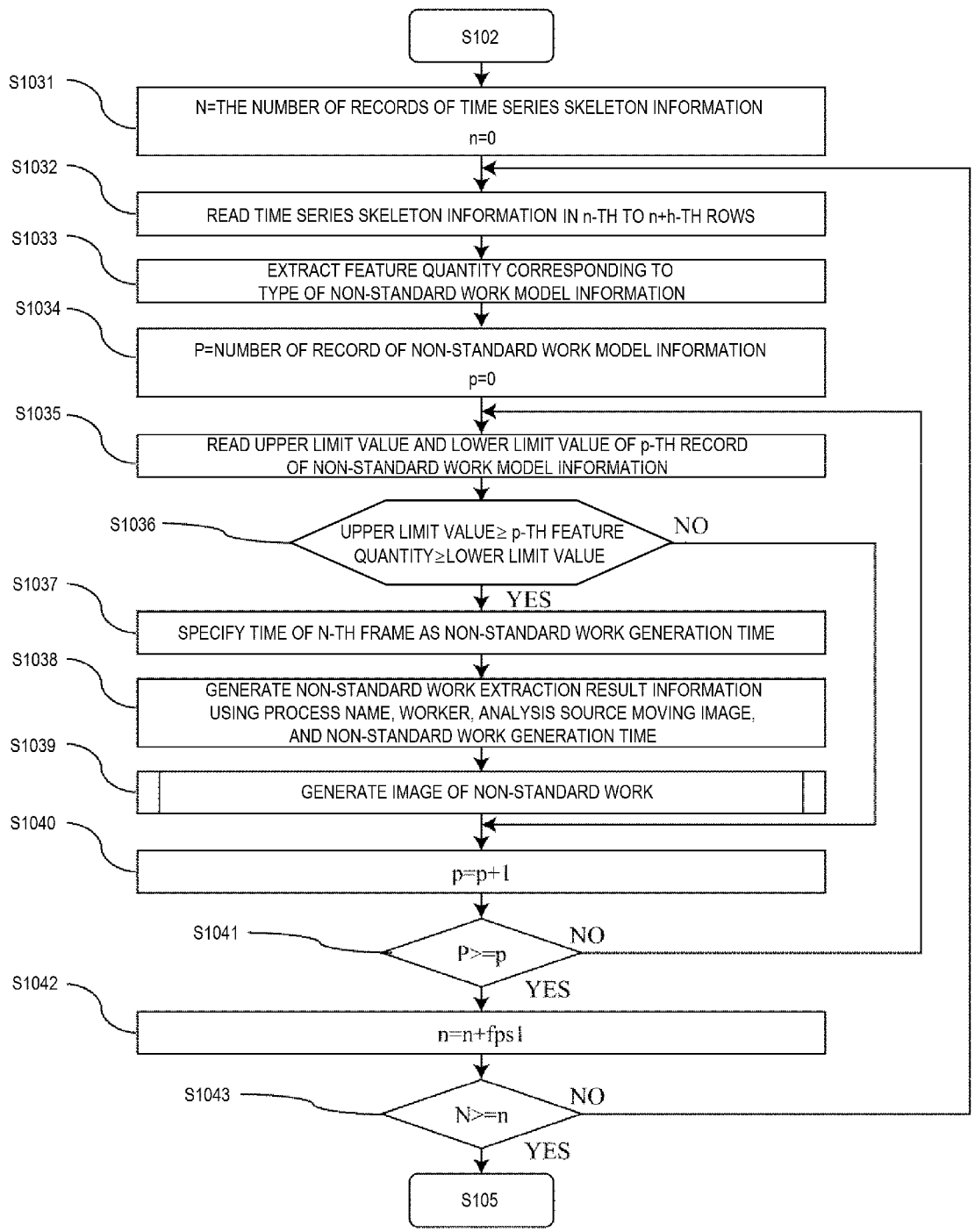
FIG. 10 is a flowchart showing an example of non-standard work extraction processing.

FIG. 10 is a flowchart showing an example of non-standard work extraction processing. The flowchart illustrates the processing performed in step S103 of FIG. 7 in more detail.

First, the non-standard work extraction unit 112 sets a total number of records of the time series skeleton information 700 generated in step S1025 shown in FIG. 8 to N, and sets a variable n indicating a number of a frame to be processed to 0 (step S1031).

Next, the non-standard work extraction unit 112 reads the time series skeleton information 700 in the n-th to n+h-th rows (step S1032). The variable h is a preset search width of a frame, and the non-standard work extraction unit 112 refers to the non-standard work extraction setting information 600 and substitutes the setting value 603 included in the record whose name 602 is "SEARCH WIDTH OF FRAME" into the variable h. The non-standard work extraction unit 112 acquires a photographing time of the n-th frame and a photographing time of the n+h-th frame, and specifies a period starting from the time of n-th frame and ending at the time of n+h-th frame. The non-standard work extraction unit 112 refers to the time 702 of the time series skeleton information 700, and reads a record corresponding to the specified period into the work area of the storage unit 120.

Next, the non-standard work extraction unit 112 extracts the feature quantity corresponding to the type of the non-standard work model information 500 (step S1033). Specifically, the non-standard work extraction unit 112 refers to the non-standard work model information 500 and specifies one record for extracting the feature quantity. For example, a description will be given assuming that the most significant record of the non-standard model information shown in FIG. 5 is specified. In the description 505 of the record, "ACCUMULATION OF ABSOLUTE VALUE OF DIFFERENCE IN RIGHT-HAND COORDINATE xy BETWEEN FRAMES FOR EACH FRAME" is described as the type of the feature quantity.

The non-standard work extraction unit 112 uses the time series skeleton information 700 read in step S1032 to obtain a value obtained by "ACCUMULATING ABSOLUTE VALUE OF DIFFERENCE IN RIGHT-HAND COORDINATE xy BETWEEN FRAMES FOR EACH FRAME" as the feature quantity corresponding to the type of the non-standard work model information 500. The non-standard work extraction unit 112 extracts the feature quantity using the time series skeleton information 700 for each record including the non-standard model information. As a result, the feature quantity of the number of records of the non-standard work model information 500 is extracted.

The non-standard work extraction unit 112 may specify the type of the feature quantity by referring to a feature quantity library generated separately from the non-standard work model information 500, and calculate a corresponding feature quantity.

Next, the non-standard work extraction unit 112 sets a total number of records of the non-standard work model information 500 to P, and sets a variable p indicating a number of the record of the non-standard work model information 500 to be processed to 0 (step S1034).

Next, the non-standard work extraction unit 112 reads an upper limit value and a lower limit value of a p-th record of the non-standard work model information 500 (step S1035). Specifically, the non-standard work extraction unit 112 reads the upper limit 503 and the lower limit 504 included in the p-th record of the non-standard work model information 500 into the work area of the storage unit 120.

Next, the non-standard work extraction unit 112 determines whether the upper limit value the ≥p-th feature quantity≥the lower limit value (step S1036). Specifically, the non-standard work extraction unit 112 specifies the feature quantity corresponding to the type of the p-th record of the non-standard work model information 500 from the feature quantities extracted in step S1033. The non-standard work extraction unit 112 compares the upper limit value and the lower limit value read in step S1035 with the specified feature quantity, and determines whether or not the p-th feature quantity is equal to or less than the upper limit and equal to or greater than the lower limit.

If the non-standard work extraction unit 112 determines that the p-th feature quantity exceeds the upper limit value or falls below the lower limit value (if "NO" in step S1036), the non-standard work extraction unit 112 moves the processing to step S1040.

If the non-standard work extraction unit 112 determines that the p-th feature quantity is equal to or less than the upper limit value and is equal to or greater than the lower limit value (if "YES" in step S1036), the work related to the feature quantity satisfies the condition of the non-standard work, so that the work is regarded as the non-standard work. In this case, the non-standard work extraction unit 112 specifies the time of n as the non-standard work generation time (step S1037). Specifically, the non-standard work extraction unit 112 refers to the time series skeleton information 700, and specifies the time 702 included in the n-th record as the non-standard work generation time.

Next, the non-standard work extraction unit 112 generates the non-standard work extraction result information using the process name, the worker, the analysis source moving image, and the non-standard work generation time (step S1038). Specifically, the non-standard work extraction unit 112 associates the process name 302, the work location name 303, the moving image file 307 which are included in the record of the work result information 300 specified as the target of the non-standard work output processing in step S101 of FIG. 7 and the non-standard work generation time specified in step S1037, and generates a record of the non-standard work extraction result information.

FIG. 11 is a table showing an example of a data structure of non-standard work extraction result information 800. The non-standard work extraction result information 800 includes an identifier 801, a process name 802, a work name 803, a worker 804, an analysis source moving image 805, a non-standard work generation time 806, a shortenable time 807, an image 808, skeleton information 809, and a work procedure information applicable location 810.

The identifier 801 is identification information for specifying a record of the non-standard work extraction result information 800. The process name 802 is information indicating a name of the process of the non-standard work. The work name 803 is information indicating a work content of the non-standard work. The worker 804 is information indicating a worker of the non-standard work. The analysis source moving image 805 is information for specifying a workplace internal image from which the non-standard work is extracted.

The non-standard work generation time 806 is information indicating a time when the non-standard work is generated. The shortenable time 807 is information indicating a time that can be shortened in the non-standard work. The image 808 is identification information for specifying a non-standard work image generated in non-standard work image generation processing to be described later. The skeleton information 809 is identification information for specifying skeleton information of the non-standard work.

The work procedure information applicable location 810 is information indicating an applicable location of the work procedure information in which the work procedure of the non-standard work is described.

As described above, in step S1038 shown in FIG. 10, the non-standard work extraction unit 112 generates a record of the non-standard work extraction result information 800 using the process name, the worker, the analysis source moving image, and the non-standard work generation time. Referring to FIG. 11, the non-standard work extraction unit 112 associates the process name 802, the worker 804, the analysis source moving image 805, and the non-standard work generation time 806 with the identifier 801, and generates a record of the non-standard work extraction result information 800. At the end of step S1038, the work name 803, the shortenable time 807, the image 808, the skeleton information 809, and the work procedure information applicable location 810 of the generated record contains no specific information.

The description returns to FIG. 10. Next, the image generation unit 115 generates an image of the non-standard work (step S1039).

Figure 12:
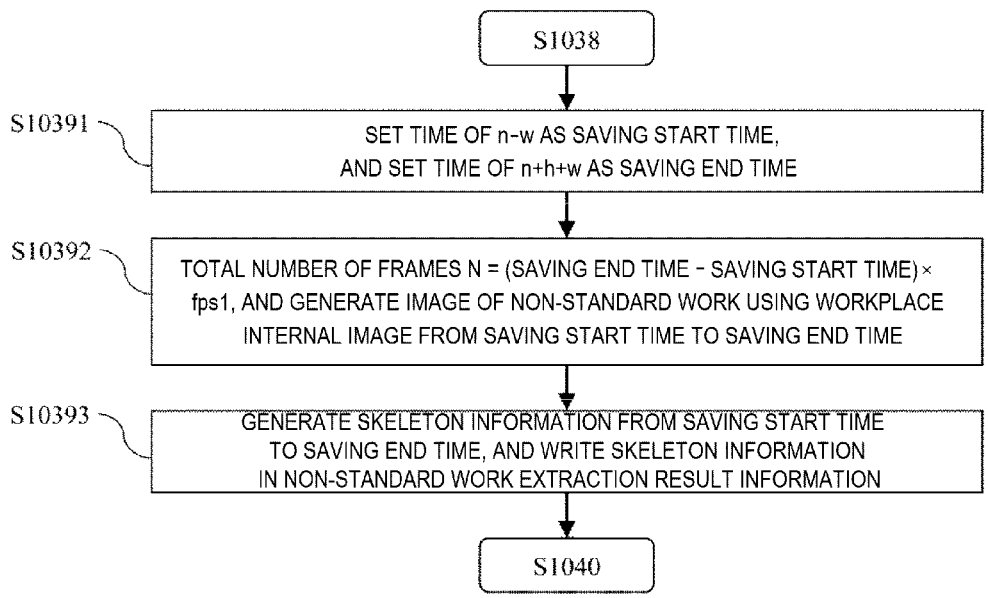
FIG. 12 is a flowchart showing an example of non-standard work image generation processing.

FIG. 12 is a flowchart showing an example of non-standard work image generation processing. The figure illustrates the processing performed in step S1039 of FIG. 10 in more detail.

First, the image generation unit 115 sets a time of n−w as a saving start time, and sets a time of n+h+w as a saving end time (step S10391). Specifically, the image generation unit 115 refers to the non-standard work extraction setting information 600, sets the setting value 603 of the record whose name 602 is "PERIOD OF IMAGE TO BE SAVED" as a variable w, and subtracts the variable w from the variable n currently being executed in the non-standard work extraction processing in FIG. 10 to set the saving start time.

The image generation unit 115 calculates a value obtained by adding the variable h (search width of a frame) and the variable w to the variable n and sets the value as the saving end time. A period starting from the saving start time and ending at the saving end time is regarded as an extraction period of the non-standard work.

Next, the image generation unit 115 sets the total number of frames N=(saving end time−saving start time)×fps1, and generates an image of the non-standard work using the workplace internal image from the saving start time to the saving end time (step S10392). Specifically, the image generation unit 115 refers to the non-standard work extraction setting information 600, and substitutes the setting value 603 associated with the name 602 of "FPS SAVING" into a variable fps1. The image generation unit 115 obtains the total number of frames N by multiplying the value, obtained by subtracting the saving start time from the saving end time obtained in step S10391, by the variable fps1.

The image generation unit 115 uses the frame image constituting the workplace internal image, and generates an image that is photographed at a frame interval of the variable fps1, and that starts from the saving start time and ends at the saving end time. The generated image is set as a non-standard work image. The total number of frames of the non-standard work image is N. The image generation unit 115 writes information for specifying the generated non-standard work image (which may be information indicating a saving destination of the non-standard work image) in the image 808 of the record of the non-standard work extraction result information 800 generated in step S1038 in FIG. 10.

Next, the image generation unit 115 generates skeleton information from the saving start time to the saving end time, and writes the skeleton information in the non-standard work extraction result information 800 (step S10393). Specifically, the image generation unit 115 refers to the skeleton 309 included in the record of the work result information 300 specified in step S101 in FIG. 7, and specifies the skeleton information of the workplace internal image read in step S101. The image generation unit 115 generates skeleton information in the extraction period by referring to information related to the time included in the skeleton information.

The image generation unit 115 writes information for specifying the generated skeleton information (which may be information indicating a saving destination of the skeleton information) in the skeleton information 809 of the record of the non-standard work extraction result information 800 generated in step S1038 in FIG. 10. Then, the image generation unit 115 ends the processing of the flowchart. The non-standard work extraction unit 112 moves the processing to step S1040 in FIG. 10.

The description returns to FIG. 10. Next, the non-standard work extraction unit 112 adds 1 top (step S1040).

Next, the non-standard work extraction unit 112 determines whether or not P≥p is satisfied (step S1041). If the non-standard work extraction unit 112 determines that P≥p is not satisfied (if "NO" in step S1041), the non-standard work extraction unit 112 moves the processing to step S1035. That is, the extraction processing of the non-standard work is executed for other records recorded continuously with the record of the non-standard work model information 500 that is the target of the processing from step S1035 to step S1039.

If the non-standard work extraction unit 112 determines that P≥p is satisfied (if "YES" in step S1041), the non-standard work extraction unit 112 adds fps1 to n (step S1042). As described above, the fps1 is the setting value 603 associated with the "SAVING FPS" of the name 602 in the non-standard work extraction setting information 600.

Next, the non-standard work extraction unit 112 determines whether or not N≥n (step S1043). If the non-standard work extraction unit 112 determines that N≥n is not satisfied (if "NO" in step S1043), the non-standard work extraction unit 112 moves the processing to step S1032.

If the non-standard work extraction unit 112 determines that N≥n is satisfied (if "YES" in step S1043), the non-standard work extraction unit 112 ends the processing of the flowchart, and moves the processing to step S105 in FIG. 7.

According to the present embodiment, one piece or a plurality of pieces of non-standard works included in the workplace internal image specified in step S101 are extracted, and the non-standard work image and skeleton information are generated for each non-standard work. The non-standard work extraction unit 112 determines whether or not the time series skeleton information 700 satisfies the condition of the non-standard work included in the non-standard work model information 500, thereby determining the extraction period of the non-standard work.

The non-standard work model information 500 may include a condition indicating that the work is stopped. For example, it is possible to set the work stop condition by narrowing a numerical value range that is the condition for the feature quantity of the type obtained by "ACCUMULATING ABSOLUTE VALUE OF DIFFERENCE IN RIGHT-HAND COORDINATE xy BETWEEN FRAMES FOR EACH FRAME". The non-standard work extraction unit 112 can extract a situation where the work is stopped as non-standard work by determining whether or not the condition is satisfied.

The description is returned to FIG. 7. Next, the part specification unit 113 and the work content specification unit 114 detect the part held by the worker and an installation position thereof from the non-standard work image, and specify the work content of the non-standard work (step S105).

FIG. 13 is a flowchart showing an example of part specification processing. The figure is a flowchart for illustrating the processing in step S105 in FIG. 7 in more detail.

First, the part specification unit 113 sets Q=total number of non-standard work images and sets q=0 (step S1051). Specifically, the part specification unit 113 sets the total number of one or a plurality of non-standard images generated in step S1039 shown in FIG. 10 to Q, and sets 0 to a variable q indicating a number of the non-standard work image on which the part specification processing is to be processed.

Next, the part specification unit 113 reads a q-th non-standard work image and the time series skeleton information 700 (step S1052). Specifically, the part specification unit 113 reads the q-th non-standard work image and the skeleton information corresponding to the non-standard work image into the work area of the storage unit 120. The part specification unit 113 may read the time series skeleton information 700 corresponding to the non-standard work image instead of the skeleton information.

Next, the part specification unit 113 sets r=0 (step S1053). Here, r is a variable indicating a number of frame on which the work is to be executed in the non-standard work image. The part specification unit 113 sets 0 to the variable r.

Next, the part specification unit 113 determines whether or not the right hand or the left hand at an r-th frame to a r+h-th frame is moving from the preparation area to the work area (step S1054). As described above, the variable h is the setting value 603 related to the "SEARCH WIDTH OF FRAME" of the name 602 in the non-standard work extraction setting information 600. The part specification unit 113 specifies a time corresponding to the r-th frame and a time corresponding to the r+h-th frame among the frames constituting the non-standard work image. The part specification unit 113 refers to the skeleton information and extracts positions of joints of the right hand and the left hand in a period starting from the time related to r and ending at the time related to r+h.

FIGS. 14A to 14C are diagrams for illustrating the work area and the preparation area. FIG. 14A is an image of the work area and the preparation area. FIG. 14B is an example of information for specifying the work area. FIG. 14C is an example of information for specifying the preparation area. The information for specifying the work area and the information for specifying the preparation area is stored in the area information storage unit 129 of the storage unit 120.

FIG. 14A is an example of a workplace internal image, and two work tables are displayed in addition to a worker. The worker prepares the work on the work table displayed in the preparation area shown in FIG. 14A, and performs the work on the work table displayed in the work area. In the preparation area, parts are generally displayed. In the work area, products or parts or both are generally displayed.

FIG. 14B shows information for specifying the work area in the workplace internal image. In the workplace internal image, "1" is described at a location corresponding to the work area. "0" is described in other locations. The part specification unit 113 determines whether or not the right hand or the left hand is in the work area when the skeleton position of the right hand or the left hand is at the location "1".

FIG. 14C shows information for specifying the preparation area in the workplace internal image. In the workplace internal image, "1" is described in a location corresponding to the preparation area. "0" is described in other locations. The part specification unit 113 determines whether or not the right hand or the left hand is in the preparation area when the skeleton position of the right hand or the left hand is at the location "1".

That is, in step S1054 of FIG. 13, the part specification unit 113 refers to the area information storage unit 129, and determines whether or not the skeleton position of the right hand or the left hand is moved from the preparation area to the work area during a time of r to r+h.

The information for specifying the work area shown in FIG. 14B and the information for specifying the preparation area shown in FIG. 14C are generated by specifying the position on a two-dimensional plane with respect to the workplace internal image. However, the information for specifying the work area and the information for specifying the preparation area is not limited to two-dimensional information. For example, information indicating a three-dimensional spatial position in a real space such as the inside of a workplace may be used.

In addition, the part specification unit 113 performs processing with the joint of the right hand or the left hand as a standard location to be used as a determination standard of the part specification processing. However, the standard location is not limited to the joint of the right hand or the left hand, and may be at least a part of the body of the worker.

If the part specification unit 113 determines that the skeleton position of the right hand or the left hand is not moved from the preparation area to the work area (if "NO" in step S1054), the part specification unit 113 sets r=r+fps2 (step S1055). Specifically, the part specification unit 113 refers to the non-standard work extraction setting information 600, and sets the setting value 603 associated with the "FPS PROCESSING" of the name 602 as "fps2". The part specification unit 113 adds fps2 to r at the time of processing to obtain a new r, and returns the processing to step S1054.

If the part specification unit 113 determines that the skeleton position of the right hand or the left hand is moved from the preparation area to the work area (if "YES" in step S1054), the part specification unit 113 sets the r-th frame to a part attachment frame PAF (step S1056). The part attachment frame PAF is stored in the work area of the storage unit 120. A timing associated with the r-th frame set to the PAF is regarded as a standard timing.

Next, the part specification unit 113 extracts images near both hands of the r-th frame to the r+h-th frame (step S1057). Specifically, the part specification unit 113 refers to the position of the joint of the right hand and the left hand in the r-th frame to the r+h-th frame extracted in step S1054, and extracts an image corresponding to the position of the joint of the right hand and the left hand of the r-th frame to the r+h-th frame in the non-standard work image read in step S1052.

At this time, the part specification unit 113 specifies the setting value 603 corresponding to the "EXTRACTION RANGE" of the name 602 in the non-standard work extraction setting information 600. The part specification unit 113 extracts images within a range of the setting value of the "EXTRACTION RANGE" with the position of the joint of the right hand and the left hand as a center, which are images corresponding to r to r+h, among the non-standard work images, as images near both hands. The extracted image is referred to as "#1".

The extracted image may be two images, a moving image at the position of the right hand, a moving image at the left hand position, and may be one moving image corresponding to the position of the right hand and the left hand when the right hand and the left hand are in a vicinity of each other in the r-th frame to the r+h-th frame. Further, the extracted images may be a set of images including different time series image groups of still images at the right hand position and different time series image groups at the left hand position.

Next, the part specification unit 113 determines whether or not all joints constituting the skeleton at the r-th frame to the r+h-th frame are away from the work area (step S1058). Specifically, the part specification unit 113 refers to the skeleton information read in step S1052, extracts the skeleton position of the worker at the r-th frame to the r+h-th frame, and determines whether or not all the skeleton positions are not in the work area. The part specification unit 113 may determine whether or not the position of the standard location in the skeleton is not in the work area, instead of determining all the skeletons of the worker. If any of the skeleton positions to be determined is in the work area, the part specification unit 113 determines that not all the joints are away from the work area ("NO" in step S1058).

If the part specification unit 113 determines that not all the joints are away from the work area (if "NO" in step S1058), the part specification unit 113 adds fps2 to r (step S1059). Then, the part specification unit 113 moves the processing to step S1058. That is, in step S1058, whether or not the skeleton of the worker is away from the work area is determined in a period starting from the time corresponding to the value obtained by adding fps2 to r and ending at the time corresponding to the value obtained by adding h to r. As a result, in a period after the standard timing, a timing on which the skeleton of the worker is moved outside the work area is acquired as a new r.

If the part specification unit 113 determines that all the joints are away from the work area (if "YES" in step S1058), the part specification unit 113 acquires an image of the work area and the preparation area as an image after the part attachment (step S1060). Specifically, the part specification unit 113 acquires an image with a portion corresponding to the work area and an image corresponding to the preparation area in the period starting from the time corresponding to r and ending at the time corresponding to the value obtained by adding h to r among the non-standard work images read in step S1052. The acquired image is stored in the work area of the storage unit 120 as an image after the part is attached.

That is, the workplace internal image at the timing after the standard timing and at the timing when the skeleton of the worker moves outside the work area is acquired.

The part specification unit 113 stores the time corresponding to r in an area (not shown) of the storage unit 120 as a non-standard work end time.

Next, the part specification unit 113 sets r to the value of PAF (step S1061). Specifically, the part specification unit 113 substitutes the value of the PAF set in step S1056 to the variable r.

Next, the part specification unit 113 subtracts fps2 from r (step S1062).

Since the processing performed in step S1063 is similar with the processing performed in step S1058, the description thereof will be omitted. It should be noted that, r serving as a standard of the determination, is a value obtained by subtracting the fps2 in step S1062.

If the part specification unit 113 determines that any of the joints forming the skeleton at the r-th frame to the r+h-th frame is in the work area (if "NO" in step S1063), the part specification unit 113 returns the processing to step S1062.

If the part specification unit 113 determines that all joints forming the skeleton at the r-th frame to the r+h-th frame are away from the work area (if "YES" in step S1063), the part specification unit 113 acquires an image of the work area and the preparation area as the image before the part attachment (step S1064). Specifically, the part specification unit 113 acquires an image with a portion corresponding to the work area and an image corresponding to the preparation area in a period starting from the time corresponding to r and ending at the time corresponding to the value obtained by adding h to r among the non-standard work images read in step S1052. The acquired image is stored in the work area of the storage unit 120 as an image before the part is attached.

That is, the workplace internal image in a period before the standard timing and at a timing on which the skeleton of the worker is not in the work area is acquired.

The part specification unit 113 stores the time corresponding to r+h in an area (not shown) of the storage unit 120 as the non-standard work start time.

Next, in the work area, the part specification unit 113 detects an area where a difference between the image before the part attachment and the image after the part attachment is large (step S1065). Specifically, the part specification unit 113 compares the image of the work area after the part attachment acquired in step S1060 with the image of the work area before the part attachment acquired in step S1064, and detects an area having a large difference in the work area. Since a known technology is used to compare the image and specify the area having the large difference, a detailed description of a processing content will be omitted.

Next, the part specification unit 113 extracts an image after attachment with the detected area (step S1066). Specifically, the part specification unit 113 extracts the image with the area detected in step S1065 among the images after the part attachment acquired in step S1060. The extracted image will be described as "#2". The extracted image may be one or a plurality of moving images, an image group of still images, or one still image.

Next, in the preparation area, the part specification unit 113 detects an area where the difference between the image before the part attachment and the image after the part attachment is large (step S1067). Specifically, the part specification unit 113 compares the image of the preparation area after the part attachment acquired in step S1060 with the image of the preparation area before the part attachment acquired in step S1064, and detects an area having a large difference in the work area. The detected area is regarded as a part attachment position.

Next, the part specification unit 113 extracts the image before the attachment with the detected area (step S1068). Specifically, the part specification unit 113 extracts the image with the area detected in step S1067 among the image before the part attachment acquired in step S1064. The extracted image will be described as "#3". The extracted image may be one or a plurality of moving images, an image group of still images, or one still image, which is similar with the image after the part attachment ("#2").

Next, the part specification unit 113 specifies camera setting information (step S1069). The part specification unit 113 specifies the camera setting information of a camera that photographs the workplace internal image read in step S101 with reference to the workplace internal image storage unit 126.

Next, the part specification unit 113 associates a virtual camera based on the 3D data with the specified camera setting information (step S1070). Specifically, the part specification unit 113 refers to the design information read into the work area in step S101. The part specification unit 113 associates setting of the virtual camera for photographing a virtual area of the design information for displaying the product with the camera setting information specified in step S1069. As a result, in the image obtained by photographing the virtual area of the design information, a part serving as a work target is displayed in an area corresponding to the work area which is an attachment position of the part.

Next, the part specification unit 113 extracts a part at a position corresponding to the part attachment position as a target candidate part (step S1071). Specifically, the part specification unit 113 extracts, as the target candidate part, one or a plurality of parts displayed in the area detected in step S1065, that is, the area detected as the part attachment position, among the images of the virtual space reflected in the camera set in step S1070.

Next, the part specification unit 113 acquires an image of each of the target candidate parts using the virtual camera (step S1072). Specifically, the part specification unit 113 acquires an image, for each of the one or a plurality of target candidate parts extracted in step S1071, by using the virtual camera set in step S1070. The acquired one or the plurality of images are referred to as "#4".

Next, the part specification unit 113 calculates similarities of the image of "#1", the image of "#2", the image of "#3", and the image of "#4" with one another (step S1073). The image of "#1", the image of "#2", and the image of "#3" are considered to be obtained by photographing parts included in the workplace internal image, and the image of "#4" is considered to be obtained by photographing parts included in the design information. The part specification unit 113 calculates a similarity with a combination of the image of "#1", the image of "#2", and the image of "#3" for each image of "#4" acquired in step S1072.

Since a known method is used as a method for calculating the similarity of the image, description thereof is omitted.

Any of the image of "#1", the image of "#2", the image of "#3", and the image of "#4" used for calculating the similarity may be a moving image or a still image.

As a result, the similarity of the same number as the number of images of "#4" acquired in step S1072 is calculated.

The image of "#1", the image of "#2", and the image of "#3" may be acquired from the workplace internal image in the same extraction period, or may be acquired from the workplace internal image of different extraction periods.

FIGS. 15A and 15B are tables showing an example of a data structure of information stored in a part of the work area of the storage unit 120. FIG. 15A is an example of a data structure of similarity information 900 including the calculated similarities. FIG. 15B is an example of a data structure of work procedure reference information 1000. FIG. 15B will be described later.

The similarity information 900 includes an identifier 901, a part name 902, and a similarity 903. The identifier 901 is identification information for specifying a record of the similarity information 900. The part name 902 is information indicating a part name of the target candidate part.

The similarity 903 is a similarity calculated for a part related to the part name 902.

The part specification unit 113 writes the similarity calculated for each of the extracted target candidate parts to the similarity 903.

The description returns to FIG. 13. Next, the part specification unit 113 specifies a part name of a target candidate part having a highest similarity (step S1074). Specifically, the part specification unit 113 specifies the image of "#4" in which the highest similarity among the similarities calculated in step S1073 is calculated. The part specification unit 113 specifies the part name of the part photographed in the specified image of "#4" by referring to the design information. That is, the part specification unit 113 specifies the part used in the non-standard work by calculating a similarity between the part included in the workplace internal image and the part included in the design information.

Next, the work content specification unit 114 refers to the work procedure information by using the part name to specify the applicable location and the work content (step S1075). Specifically, the work content specification unit 114 searches the work procedure information read in the work area in step S101 using a character string of the part name specified in step S1074. The work content specification unit 114 acquires a description location most relevant to the part name and the work content described in the description location as a search result of the applicable location and the work content.

The work content specification unit 114 may specify a display target location by using the work procedure reference information 1000 in which the part name and the display target location of the work procedure information are associated with each other.

The description will be given with reference to FIG. 15B. The work procedure reference information 1000 includes an identifier 1001, a part name 1002, and a page 1003. The identifier 1001 is identification information for specifying a record of the work procedure information. The part name 1002 is a name of a part serving as a work target. The page 1003 is information indicating a reference location of the work procedure information in a case where the part specified by the part name 1002 is a target of the non-standard work.

The work content specification unit 114 refers to the work procedure reference information 1000, and specifies the display target location by specifying the page 1003 associated with the part name specified in step S1074.

Next, the work content specification unit 114 updates non-standard work extraction result information by using the information indicating the applicable location and the work content (step S1076). Specifically, the work content specification unit 114 refers to the non-standard work extraction result information 800, and specifies a record including the q-th non-standard work image currently being processed in the image 808. The work content specification unit 114 writes information indicating the work content acquired in step S1075 to the work name 803 of the specified record, and writes information indicating the applicable location acquired in the same step to the work procedure information applicable location 810 of the record.

Next, the part specification unit 113 adds 1 to the variable q (step S1077).

Next, the part specification unit 113 determines whether or not q>Q is satisfied (step S1078). If the part specification unit 113 determines that q>Q is not satisfied (if "NO" in step S1078), the part specification unit 113 returns the processing to step S1052. That is, the processing of step S1052 and subsequent steps is executed for other non-standard work images recorded continuously with the non-standard work image in which the processing from step S1052 to step S1076 is performed.

If the part specification unit 113 determines that q>Q is satisfied (if "YES" in step S1078), the part specification unit 113 ends the processing of the flowchart, and moves the processing to step S108 shown in FIG. 7.

The description is returned to FIG. 7. Next, the non-standard work extraction unit 112 calculates a shortenable time (step S108). Specifically, the non-standard work extraction unit 112 calculates a period starting from the non-standard work start time and ending at the non-standard work end time in the workplace internal image as the shortenable time.

The non-standard work extraction unit 112 specifies the record of the non-standard work extraction result information 800, and, when the record is generated, calculates the shortenable time using the non-standard work start time stored in the storage unit 120 in step S1064 and the non-standard work end time stored in step S1060 of the part specification processing shown in FIG. 13. The non-standard work extraction unit 112 writes the calculated shortenable time to the shortenable time 807 of the record of the specified non-standard work extraction result information 800. The non-standard work extraction unit 112 calculates a shortenable time for each record of the non-standard work extraction result information 800, and updates the non-standard work extraction result information 800.

As described above, the non-standard work extraction unit acquires the shortenable time by a predetermined method using the workplace internal image. In the present embodiment, a time from the time when it is determined that the non-standard work is started in the workplace internal images to the time when it is determined that the non-standard work is ended is acquired as the shortenable time. However, the method for extracting the time as the shortenable time is not limited to thereto. For example, a standard work time for the work content may be set in advance, and the time required for the non-standard work may be subtracted to obtain the shortenable time.

Next, the display information generation unit 116 generates display information of a screen according to the request and transmits the display information to the user terminal device 200 (step S109). Then, the control unit 110 ends the processing of the above flowchart. The output unit 230 of the user terminal device 200, that receives the display information as a response to the request of the non-standard work request unit 211, outputs a screen using the received display information.

For example, when the work skill supporting device 100 receives a request for a non-standard work list screen from the user terminal device 200, the display information generation unit 116 of the work skill supporting device 100 generates display information of the non-standard work list screen and transmits the display information to the user terminal device 200.

Figure 16:
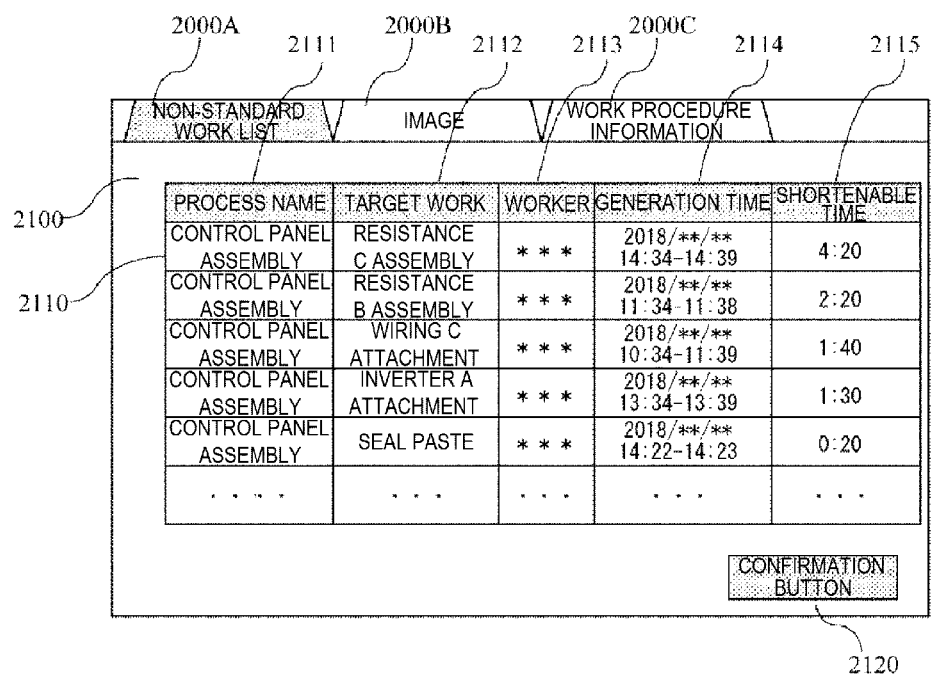
FIG. 16 is a diagram showing an example of a non-standard work list screen.

FIG. 16 is a diagram showing an example of a non-standard work list screen 2100. The non-standard work list screen 2100 includes a non-standard work list display area 2110 and a confirmation button 2120. In the present embodiment, a non-standard work list tab 2000A, an image tab 2000B, and a work procedure information tab 2000C are displayed on a screen of the user terminal device 200. When the non-standard work list tab 2000A is selected, the non-standard work list screen 2100 is displayed.

The non-standard work list display area 2110 is an area for displaying a list of the non-standard work performed by a certain worker. The confirmation button 2120 is a button for receiving an input when the worker confirms a display content of the non-standard work list screen 2100.

In the present embodiment, when the user inputs login information to the user terminal device 200 and the user is authenticated, the work skill supporting device 100 transmits display information of the non-standard work list screen 2100. At this time, the display information generation unit 116 refers to the non-standard work extraction result information 800 by using the login information, and generates the display information of the non-standard work list screen 2100 using the information included in the record having the authenticated user as the worker 804.

The non-standard work list display area 2110 includes a process name 2111, a target work 2112, a worker 2113, a generation time 2114, and a shortenable time 2115. The process name 2111 is information indicating a process of the work performed by the authenticated worker, and corresponds to the process name 802 of the non-standard work extraction result information 800. The target work 2112 is information indicating the work content, and corresponds to the work name 803 of the non-standard work extraction result information 800.

The worker 2113 is information indicating a worker of the non-standard work, and corresponds to the worker 804 of the non-standard work extraction result information 800. The worker 2113 includes the authenticated worker. The generation time 2114 is information indicating a generation time of the non-standard work, and corresponds to the non-standard work generation time 806 of the non-standard work extraction result information 800. The shortenable time 2115 is information indicating a time that would be shortened when there is no non-standard work, and corresponds to the shortenable time 807 of the non-standard work extraction result information 800.

When the confirmation button 2120 is selected, the non-standard work extraction unit 112 extracts a record corresponding to the non-standard work displayed in the non-standard work list display area 2110 from the non-standard work extraction result information 800. In an area (not shown) of the storage unit 120, number-of-times-of-confirmation information in which the number of times of confirmations is recorded for each record of the non-standard work extraction result information 800 is stored. The number of times of confirmations is the same as the number of times of inputs of the confirmation button 2120. The non-standard work extraction unit 112 increments the number of times of confirmations by referring to the number-of-times-of-confirmation information corresponding to the extracted record.

When one piece of the non-standard work displayed in the non-standard work list display area 2110 is selected and the image tab 2000B is selected, the display screen transits to a non-standard work image display screen.

Figure 17:
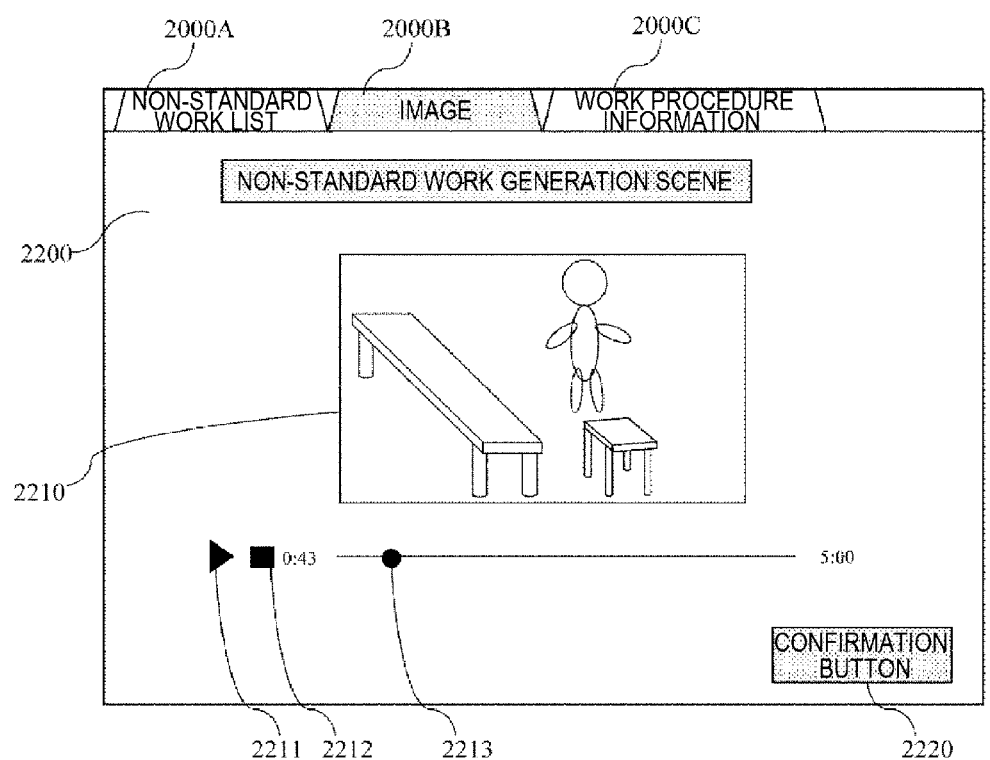
FIG. 17 is a diagram showing an example of a non-standard work image display screen.

FIG. 17 is a diagram showing an example of a non-standard work image display screen 2200. The non-standard work image display screen 2200 includes a non-standard work image display area 2210, a play button 2211, a stop button 2212, a play position 2213, and a confirmation button 2220. The non-standard work image display area 2210 is an area for displaying a non-standard work image. The display information generation unit 116 refers to the image 808 of the non-standard work extraction result information 800, specifies a non-standard work image generated for the non-standard work selected in the non-standard work list display area 2110, and displays the specified non-standard work image in the non-standard work image display area 2210.

The play button 2211 is a button for receiving an input operation of a play start instruction of the non-standard work image. The stop button 2212 is a button for receiving an input operation of a play end instruction of the non-standard work image. The play position 2213 displays a play status of the non-standard work image. The confirmation button 2220 is a button for receiving an input when the worker confirms a display content of the non-standard work image display screen 2200.

When the confirmation button 2220 is selected, the non-standard work extraction unit 112 increments the number of times of confirmations by referring to the number-of-times-of-confirmation information corresponding to the non-standard work displayed in the non-standard work image display area 2210.

When one piece of the non-standard work displayed in the non-standard work list display area 2110 of FIG. 16 is selected and the work procedure information tab 2000C is selected, the display screen transits to a work procedure information display screen.

Figure 18:
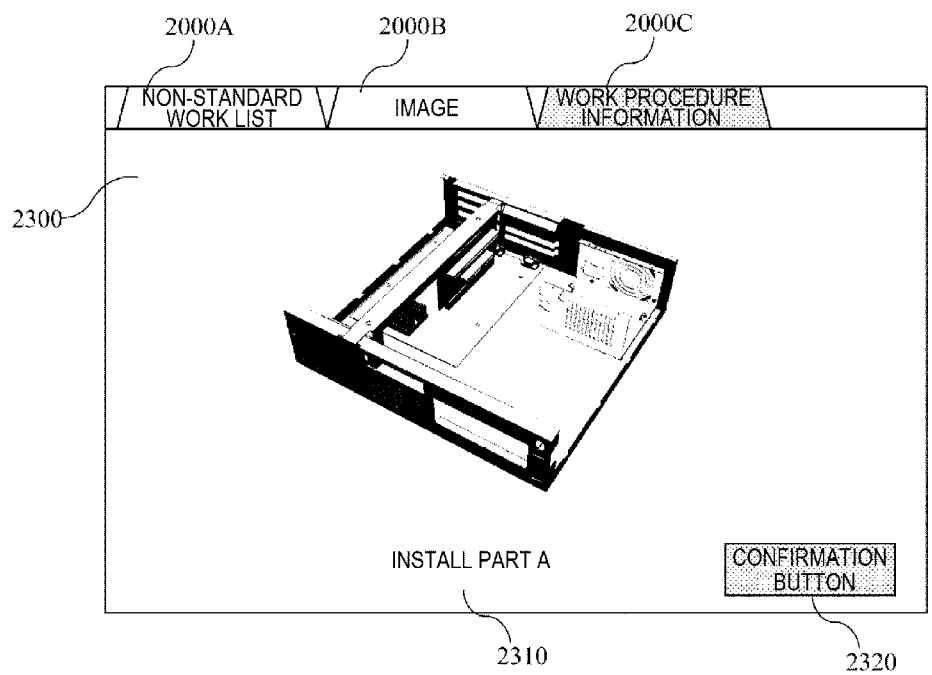
FIG. 18 is a diagram showing an example of a work procedure information display screen.

FIG. 18 is a diagram showing an example of a work procedure information display screen 2300. The work procedure information display screen 2300 includes a work procedure information display area 2310 and a confirmation button 2320. The work procedure information display area 2310 is an area for displaying work procedure information related to the non-standard work selected in the non-standard work list display area 2110. The confirmation button 2320 is a button for receiving an input when the worker confirms a display content of the work procedure information display screen 2300.

The display information generation unit refers to the non-standard work extraction result information 800, specifies an applicable location of the work procedure information using the work procedure information applicable location 810 included in the record of the selected non-standard work, and displays the specified applicable location in the work procedure information display area 2310.

When the confirmation button 2320 is selected, the non-standard work extraction unit 112 increments the number of times of confirmations by referring to the number-of-times-of confirmation information corresponding to the non-standard work in which the work procedure information is displayed in the work procedure information display area 2310.

In the work procedure information display area 2310, a work procedure may be displayed in animation, or may be displayed in a still image. As shown in FIG. 18, information included in the work procedure information may be displayed in a character string in the work procedure information display area 2310.

By referring to the non-standard work list screen 2100, the worker who performed the non-standard work can recognize a total amount of the non-standard work performed by the worker as a list. Further, by referring to the non-standard work image display screen 2200, it is possible to grasp a status of the non-standard work. Further, an improvement method can be recognized by referring to the work procedure information of the non-standard work. As a result, it is possible to promote the work skill of the worker.

At the start of the non-standard work output processing of FIG. 7, when the work skill supporting device 100 receives a request for the non-standard work confirmation screen from the user terminal device 200, the display information generation unit 116 of the work skill supporting device 100 generates display information of the non-standard work confirmation screen and transmits the display information to the user terminal device 200.

Figure 19:
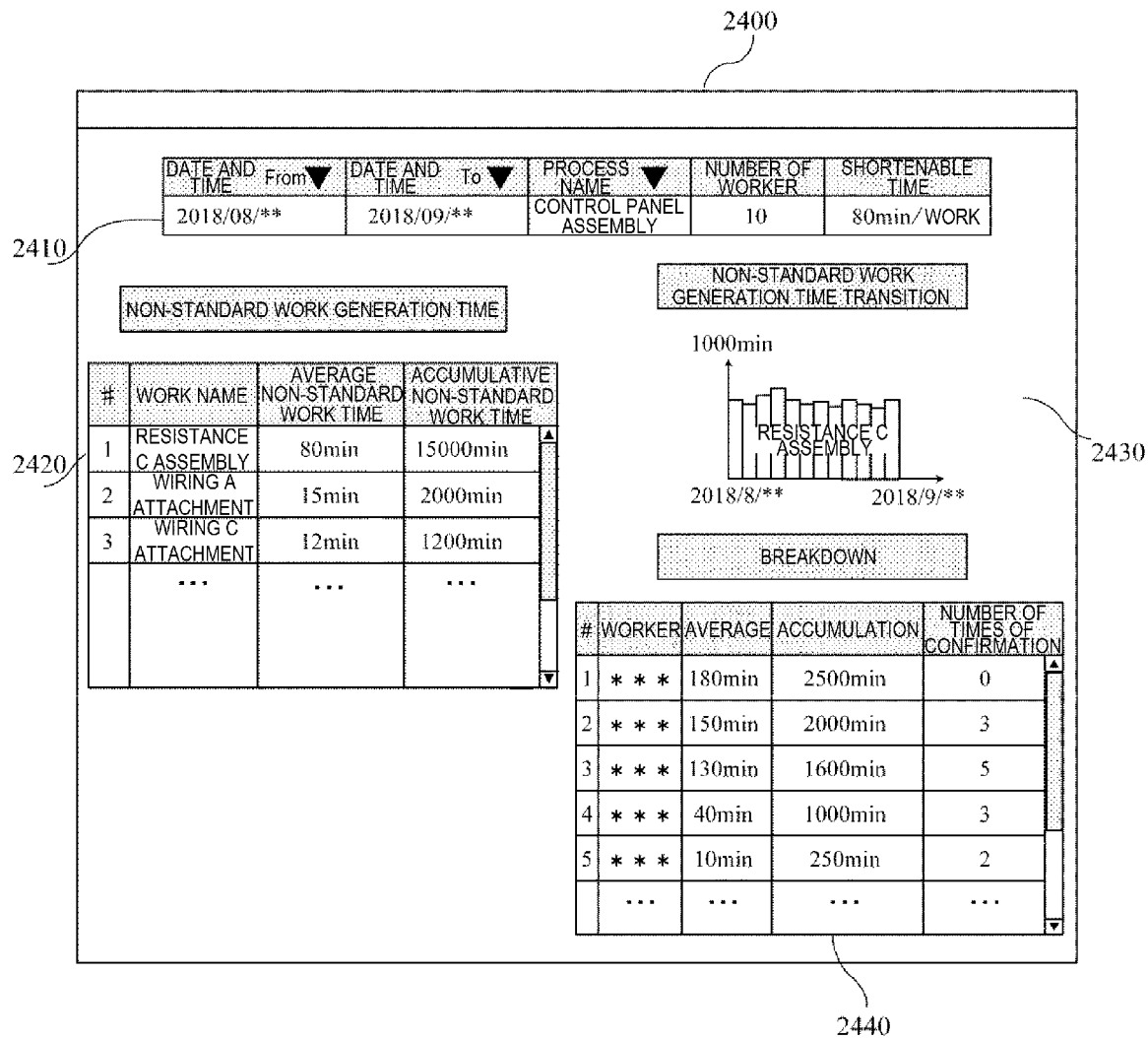
FIG. 19 is a diagram showing an example of a non-standard work confirmation screen.

FIG. 19 is a diagram showing an example of a non-standard work confirmation screen 2400. The non-standard work confirmation screen 2400 includes a display condition setting area 2410, a work name display area 2420, a generation time transition display area 2430, and a worker correspondence display area 2440.

The display condition setting area 2410 is an area for receiving an input of a display condition for displaying the non-standard work confirmation screen 2400. The display condition setting area 2410 includes, for example, a start date and time setting area, an end date and time setting area, a process name setting area, a number-of-worker display area, and an average shortenable time display area.

The start date and time setting area is an area for receiving an input of a start of a period for extracting the non-standard work to be displayed on the non-standard work confirmation screen 2400. The end date and time setting area is an area for receiving an input of an end of a period for extracting the non-standard work to be displayed on the non-standard work confirmation screen 2400. The process name setting area is an area for receiving an input of a process name of the non-standard work to be displayed. The display information generation unit 116 of the work skill supporting device 100 extracts the non-standard work performed for the process input in the process name setting area, which is non-standard work executed during a period determined based on information input in the start data and time setting area and the end date and time setting area, using the non-standard work extraction result information 800.

The number-of-worker display area is an area for displaying an accumulative total of the number of workers in the non-standard work displayed on the non-standard work confirmation screen 2400. The average shortenable time display area is an area for displaying an average value of the shortenable time per work for the non-standard work displayed on the non-standard work confirmation screen 2400.

The work name display area 2420 is an area for displaying an average non-standard work time and an accumulative non-standard work time for each work content of the non-standard work according to the input contents to the display condition setting area 2410. In order to generate display information of the work name display area 2420, the display information generation unit 116 obtains the accumulative non-standard work time by adding the shortenable time of the non-standard work of the same work content with respect to the extracted non-standard work.

The display information generation unit 116 obtains the average non-standard work time by dividing the accumulative non-standard work time by a quantity of the non-standard work. The display information generation unit 116 can specify the shortenable time of the extracted non-standard work by referring to the shortenable time 807 of the non-standard work extraction result information 800. A work name (work content) can be selectively displayed in the work name display area 2420.

The generation time transition display area 2430 is an area for displaying transition of the shortenable time of the non-standard work in the work content selected in the work name display area 2420. The display information generation unit 116 obtains transition of the shortenable time by adding the shortenable time for each preset period for the selected work content.

The worker correspondence display area 2440 is an area for displaying the average non-standard work time, the accumulative non-standard work time, and the number of times of confirmations for each worker who performed the non-standard work with the work content selected in the work name display area 2420. The display information generation unit 116 refers to the non-standard work extraction result information 800, and adds the shortenable time for each worker 804 to obtain the accumulative non-standard work time with respect to the record having the work name 803 of the selected work content. The display information generation unit 116 obtains an average non-standard work time for the worker by dividing the accumulative non-standard work time by the number of records of the non-standard work extraction result information 800 obtained by adding the shortenable time.

The display information generation unit 116 refers to the number-of-times-of-confirmation information corresponding to the record having the work name 803 of the selected work content among the records of the non-standard work extraction result information 800, thereby specifying the number of times of confirmations performed by the worker with respect to the work content. The display information generation unit 116 displays the specified number of times of confirmations in the worker correspondence display area 2440 in association with the worker.

The work name display area 2420 and the generation time transition display area 2430 are areas for displaying information related to the shortenable time for each work content. Therefore, when the non-standard work of the same work content is extracted for different workers, the shortenable time is added. By confirming the work name display area 2420, it is possible to recognize the work content in which the non-standard work is likely to generate.

Further, by referring to the generation time transition display area 2430, it is possible to confirm a difference in the generation status of the non-standard work depending on the period. Further, by referring to the worker correspondence display area 2440, it is possible to grasp a worker having a low (or high) skill level for certain work, and by referring to the average non-standard work time and the accumulative non-standard work time, it is possible to recognize a skill level of the worker.

In the worker correspondence display area 2440, the worker can be selectively displayed. When a certain worker is selected in the worker correspondence display area 2440, the display screen transits to a worker information display screen.

FIG. 20 is a diagram showing an example of a worker information display screen 2500. The worker information display screen 2500 includes a worker name display area 2510, a worker generation time transition display area 2520, and a worker non-standard work list display area 2530. The worker name display area 2510 displays the name of the worker selected in the worker correspondence display area 2440 of the non-standard work confirmation screen 2400.

The worker generation time transition display area 2520 is an area for displaying transition in the generation time of the non-standard work of the worker. The display information generation unit 116 adds the shortenable time for each preset period for the work content selected in the work name display area 2420 of the non-standard work confirmation screen 2400 among the non-standard work performed by the worker displayed in the worker correspondence display area 2440, thereby obtaining the transition of the shortenable time to be displayed in the worker generation time transition display area 2520.

The worker non-standard work list display area 2530 is an area for displaying a list of the non-standard work performed by the worker displayed in the worker name display area 2510. As an example, the generation time of the non-standard work, the shortenable time, and the number of times of confirmations are displayed in the worker non-standard work list display area 2530. The display information generation unit 116 specifies a record of the non-standard work extraction result information 800 related to the work content selected in the work name display area 2420 of the non-standard work confirmation screen 2400, among the non-standard work performed by the worker, and the non-standard work generation time 806 and the shortenable time 807 included in the record are displayed in the worker non-standard work list display area 2530. The display information generation unit 116 refers to the number-of-times-of-confirmation information, and displays the number of times of confirmations in association with the work content in the worker non-standard work list display area 2530.

As described above, by referring to the worker information display area, detailed information of the non-standard work performed by the worker can be obtained. In addition, by referring to the number of times of confirmations, it is possible to recognize whether or not the worker has an opportunity to improve by referring to the non-standard work list screen 2100, the non-standard work image, or the work procedure information.

The work skill supporting device 100 can monitor the number-of-times-of-confirmation information and prompt, by email or the like, the confirmation to the worker whose number of times of confirmations is less than or equal to a predetermined number of times within a predetermined period after the non-standard work is generated. As a result, the work skill device can efficiently promote the learning of the worker.

As described above, according to the present embodiment, it is possible to efficiently extract the worker and the work content that require skill improvement. In addition, the status and the improvement method of the non-standard work can be appropriately provided to the worker, and the manager can grasp the skill level of the worker and the confirmation status of the improvement method, and can efficiently and appropriately promote the skill of the worker.

The embodiments and modifications of the invention have been described above, but the invention is not limited to an example of the above embodiments, and includes various modifications. For example, the example of the above-described embodiments has been described in detail in order to make the invention easy to understand, and the invention is not limited to including all the configurations described herein. A part of a configuration of an example in a certain embodiment can be replaced with a configuration of another example. A configuration of another example can be added to a configuration of an example of a certain embodiment. Another configuration may be added to, deleted from, or replaced with a part of a configuration of an example in each embodiment. Each of the configurations, functions, processing units, processing methods described above may be partially or entirely implemented by hardware such as through design using an integrated circuit. Control lines and information lines shown in the figures are the ones considered to be necessary for description, and all the lines are not necessarily shown. It may be considered that almost all configurations are connected to each other.

The functional configurations of the work skill supporting device 100 and the user terminal device 200 described above are classified according to main processing contents in order to facilitate understanding. The invention is not limited by the classification method and name of the constituent elements. As described above, the work skill supporting device 100 and the user terminal device 200 can also be classified into more components according to the processing contents. One constituent can also be classified to execute more processing.

REFERENCE SIGN LIST 1 work skill supporting system
100 work skill supporting device
110/210 control unit
111 time series skeleton information acquisition unit
112 non-standard work extraction unit
113 part specification unit
114 work content specification unit
115 image generation unit
116 display information generation unit
120 storage unit
121 work result information storage unit
122 work related information storage unit
123 work procedure information storage unit
124 non-standard work model information storage unit
125 non-standard work extraction setting information storage unit
126 workplace internal image storage unit
127 design information storage unit
128 time series skeleton information storage unit
129 area information storage unit
130 non-standard work extraction result information storage unit
140/220 input unit
150/230 output unit
160/240 communication unit
161 input device
162 output device
163 external storage device
164 calculation device
165 main storage device
166 communication device
200 user terminal device
211 non-standard work request unit
300 work result information
400 work related information
500 non-standard work model information
600 non-standard work extraction setting information
700 time series skeleton information
800 non-standard work extraction result information
900 similarity information
1000 work procedure reference information
2100 non-standard work list screen
2110 non-standard work list display area
2120/2220/2320 confirmation button
2200 non-standard work image display screen
2210 non-standard work image display area
2211 play button
2212 stop button
2213 play position
2300 work procedure information display screen
2310 work procedure information display area
2400 non-standard work confirmation screen
2410 display condition setting area
2420 work name display area
2430 generation time transition display area
2440 worker correspondence display area
2500 worker information display screen
2510 worker name display area
2520 worker generation time transition display area
2530 worker non-standard work list display area
N network

The invention claimed is:

1. A work skill supporting device, comprising:
a storage unit configured to store non-standard work model information including a condition of non-standard work, work procedure information including information indicating a work content and information indicating a part to be used in work, and a workplace internal image obtained by photographing an inside of a workplace; and
a control unit configured to:
acquire time series skeleton information of one or a plurality of workers from the workplace internal image;
determine whether or not the time series skeleton information satisfies the condition;
specify a part serving as a work target using the workplace internal image for the non-standard work determined as satisfying the condition; and
specify a work content of the non-standard work with reference to the work procedure information using the specified part,
wherein the control unit is further configured to acquire a shortenable time by a predetermined method using the workplace internal image, and calculate, when a plurality of the shortenable times are acquired for the work content of the non-standard work, an accumulative shortenable time by accumulating the shortenable times.

2. The work skill supporting device according to claim 1, wherein
the storage unit is further configured to store design information of a plurality of the parts, and
the control unit is further configured to specify the part used in the non-standard work by calculating a similarity between the part included in the workplace internal image and the part included in the design information.

3. The work skill supporting device according to claim 1, wherein
control unit is further configured to generate display information of a non-standard work list screen that displays a list of the work content of the non-standard specified work.

4. The work skill supporting device according to claim 3, wherein:
control unit is further configured to:
generate a non-standard work image obtained by photographing the non-standard work using the workplace internal image; and generate display information of at least one of: the non-standard work image of the non-standard work selected on the non-standard work list screen and the work procedure information corresponding to the non-standard work.

5. The work skill supporting device according to claim 4, wherein
the control unit is further configured to display a confirmation button on a display screen of the non-standard work image or a display screen of the work procedure information, and generate display information of a non-standard work confirmation screen including the number of times of inputs of the confirmation button.

6. The work skill supporting device according to claim 1, wherein
the non-standard work model information includes a condition indicating that work is stopped, and
the control unit is further configured to extract a situation where the work is stopped as the non-standard work by determining whether or not the condition is satisfied.

7. A work skill supporting device, comprising:
a storage unit configured to store non-standard work model information including a condition of non-standard work, work procedure information including information indicating a work content and information indicating a part to be used in work, and a workplace internal image obtained by photographing an inside of a workplace; and
a control unit configured to:
acquire time series skeleton information of one or a plurality of workers from the workplace internal image;
determine whether or not the time series skeleton information satisfies the condition;
specify a part serving as a work target using the workplace internal image for the non-standard work determined as satisfying the condition; and
specify a work content of the non-standard work with reference to the work procedure information using the specified part,
wherein the storage unit is further configured to store work area information that specifies a work area and preparation area information that specifies a preparation area,
wherein the control unit is further configured to specify the part by using information displayed in the work area and information displayed in the preparation area in the workplace internal image, and
wherein the control unit is further configured to refer to the time series skeleton information, and specify the part using the workplace internal image at a standard timing when a standard location that is at least a part of a body of the worker moves from the preparation area to the work area, the workplace internal image at a timing when at least the standard location of the body of the worker is not in the work area during a period before the standard timing, and the workplace internal image at a timing when at least the standard location of the body of the worker moves out of the work area during a period after the standard timing.

8. A work skill supporting system, comprising:
a work skill supporting device; and
a user terminal device, the work skill supporting device and the user terminal device being communicably connected, wherein
the work skill supporting device includes:
a storage unit configured to store non-standard work model information including a condition of non-standard work, work procedure information including information indicating a work content and information indicating a part to be used in work, and a workplace internal image obtained by photographing an inside of a workplace; and,
a control unit configured to:
acquire time series skeleton information of one or a plurality of workers from the workplace internal image;
determine whether or not the time series skeleton information satisfies the condition;
specify a part serving as a work target using the workplace internal image for the non-standard work determined as satisfying the condition; and
specify a work content of the non-standard work with reference to the work procedure information using the part specified by the part specification unit; and
the user terminal device includes:
another control unit configured to request a work content of the non-standard work from the work skill supporting device and receives a response, and
an output unit configured to output the work content of the non-standard work,
wherein the control unit of the work skill supporting device is further configured to acquire a shortenable time by a predetermined method using the workplace internal image, and calculate, when a plurality of the shortenable times are acquired for the work content of the non-standard work, an accumulative shortenable time by accumulating the shortenable times.

* * * * *